A. G. F. KUROWSKI.
RECORDING TAXIMETER.
APPLICATION FILED OCT. 21, 1916.

1,275,185.

Patented Aug. 6, 1918.
13 SHEETS—SHEET 1.

WITNESSES

Inventor
Alfred G. F. Kurowski
By his Attorney

A. G. F. KUROWSKI.
RECORDING TAXIMETER.
APPLICATION FILED OCT. 21, 1916.
1,275,185.
Patented Aug. 6, 1918.
13 SHEETS—SHEET 2.
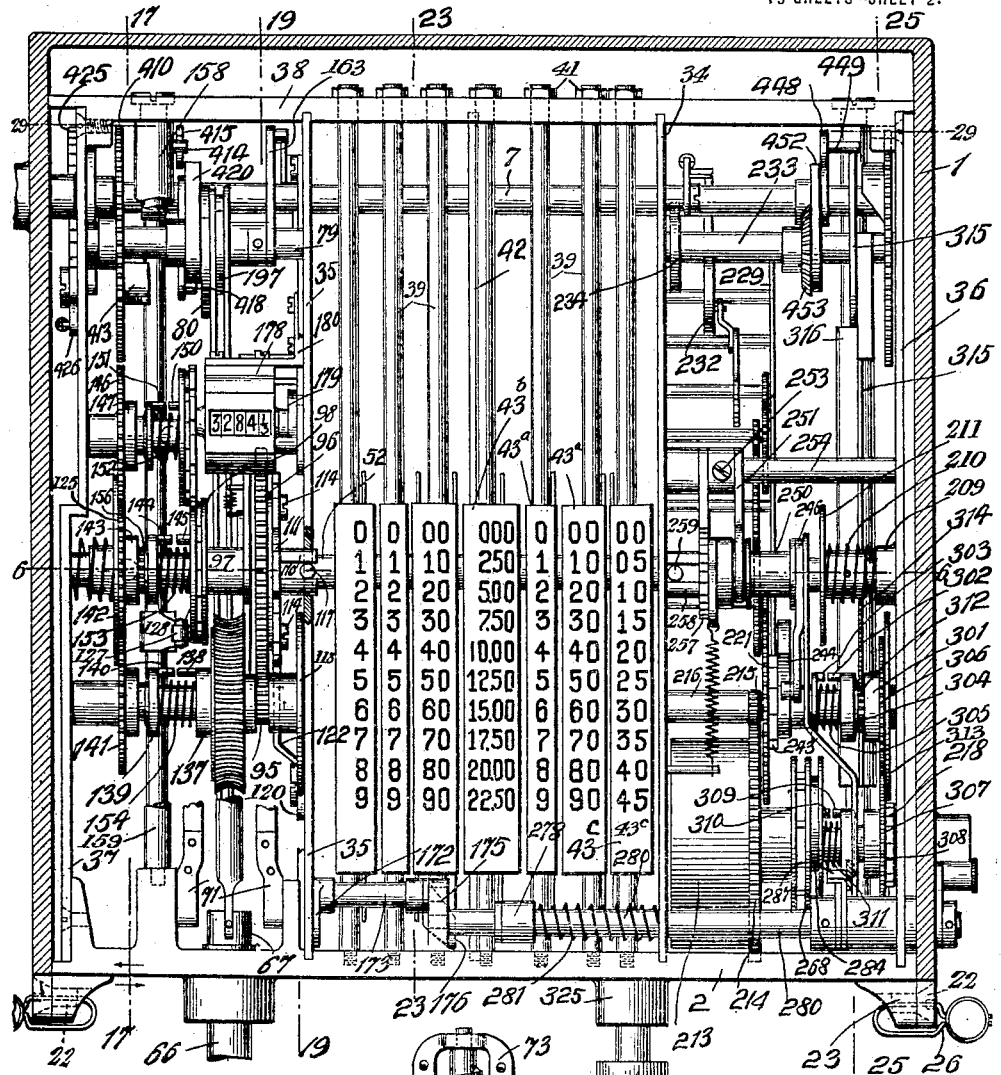
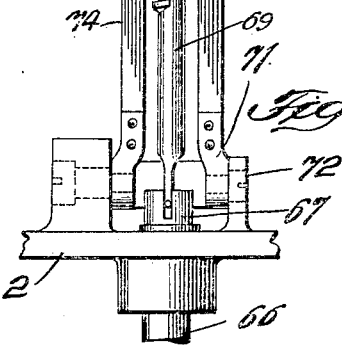
WITNESSES:
INVENTOR
Alfred G. F. Kurowski
BY
Lockwood
ATTORNEY

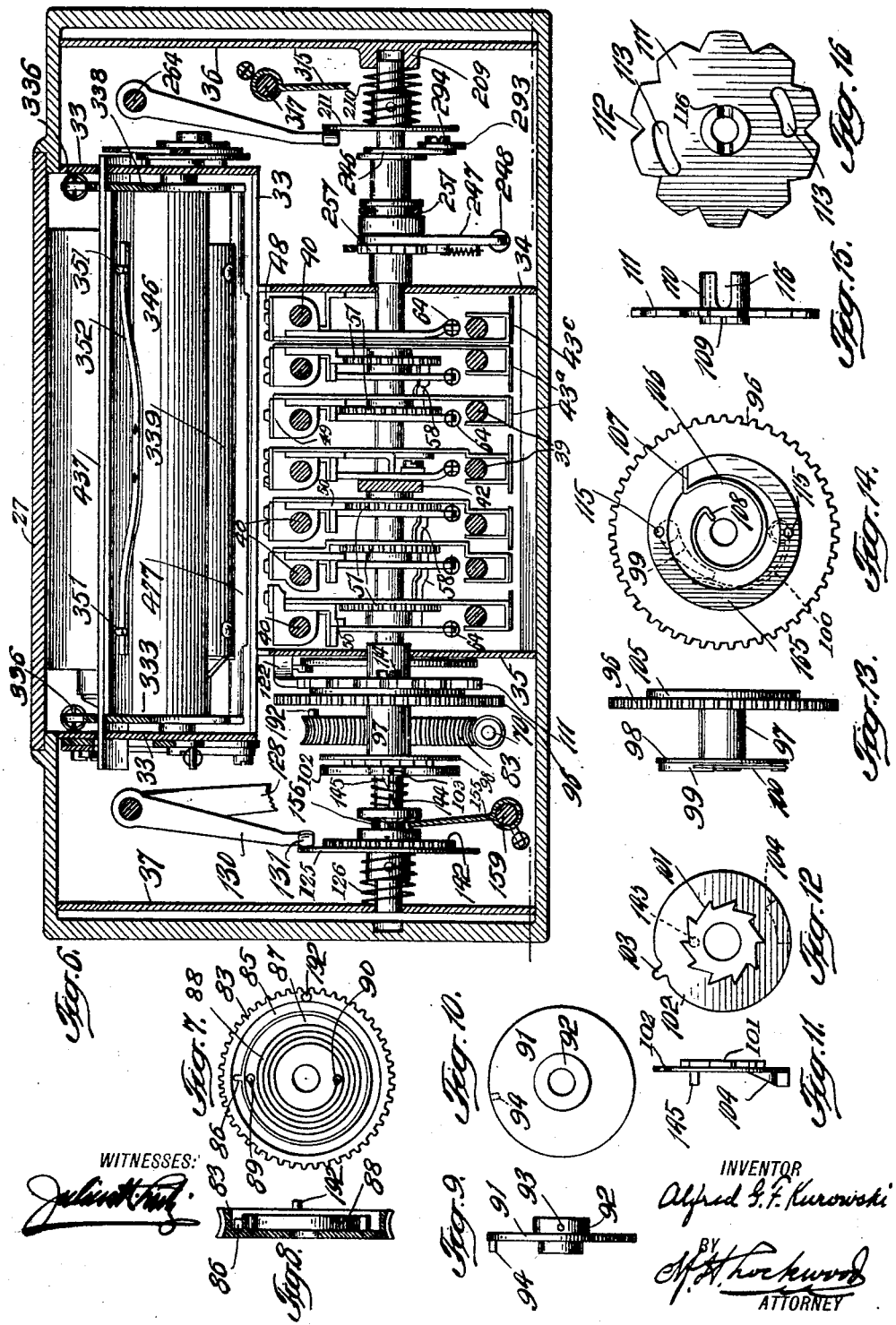

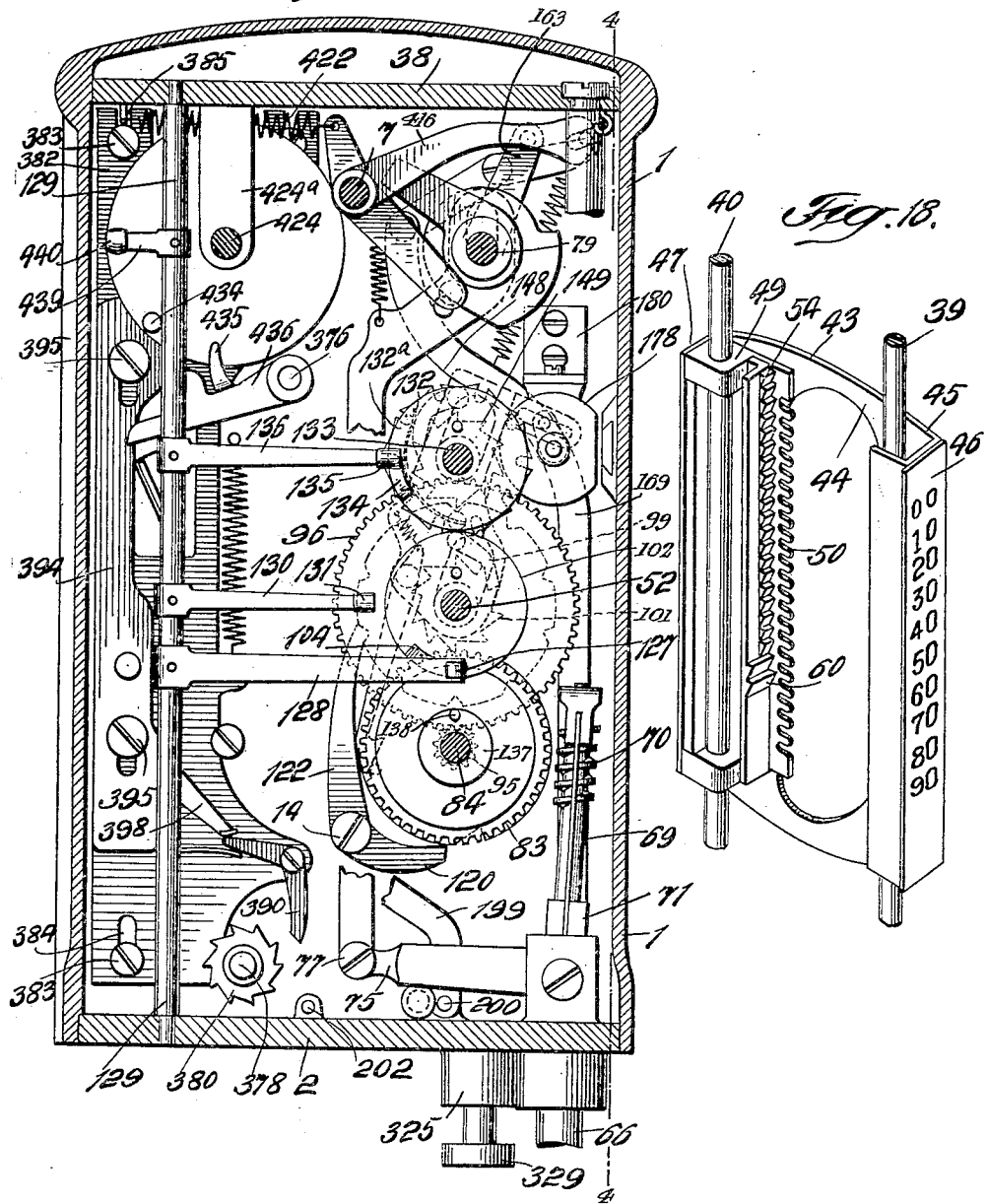

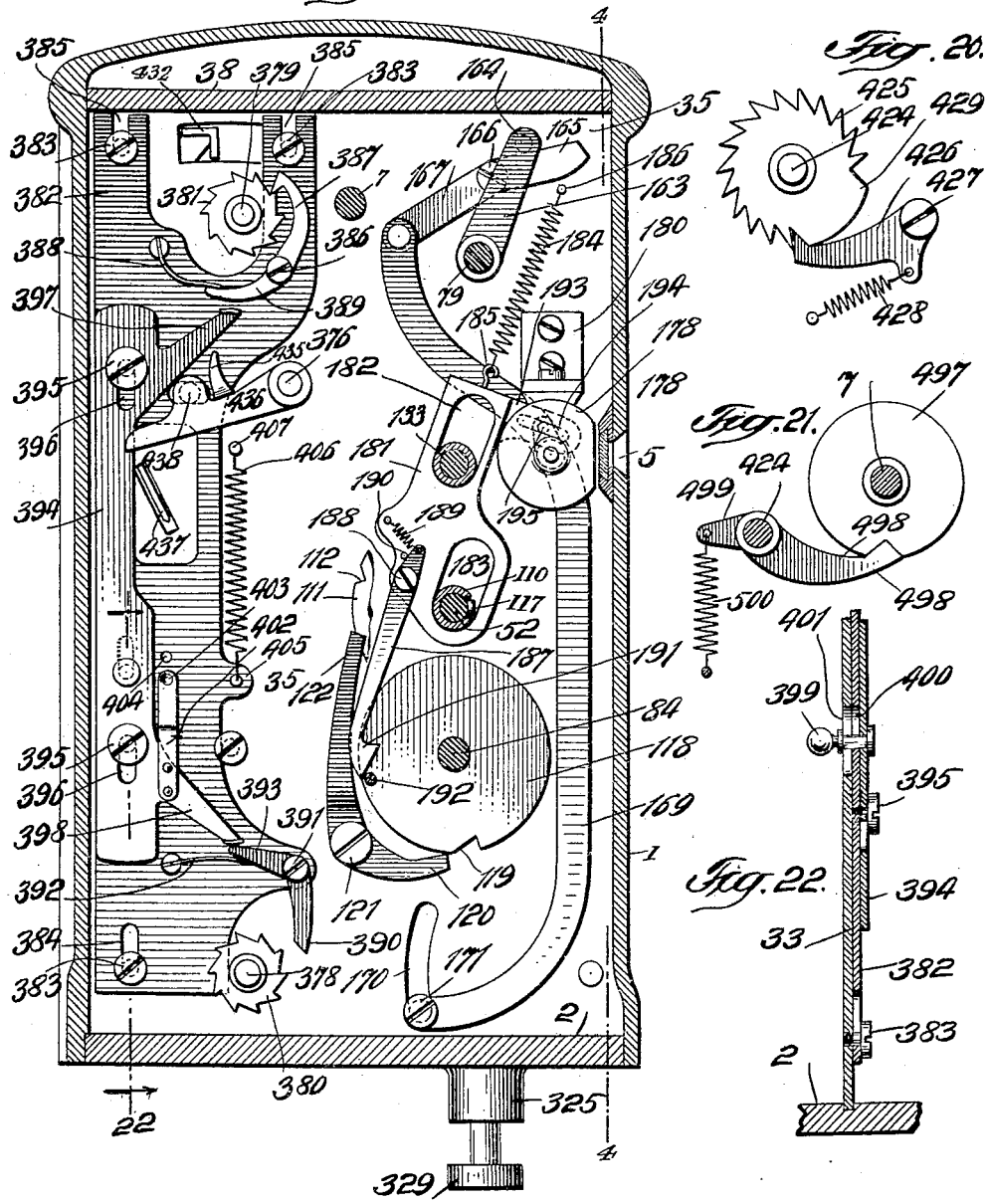

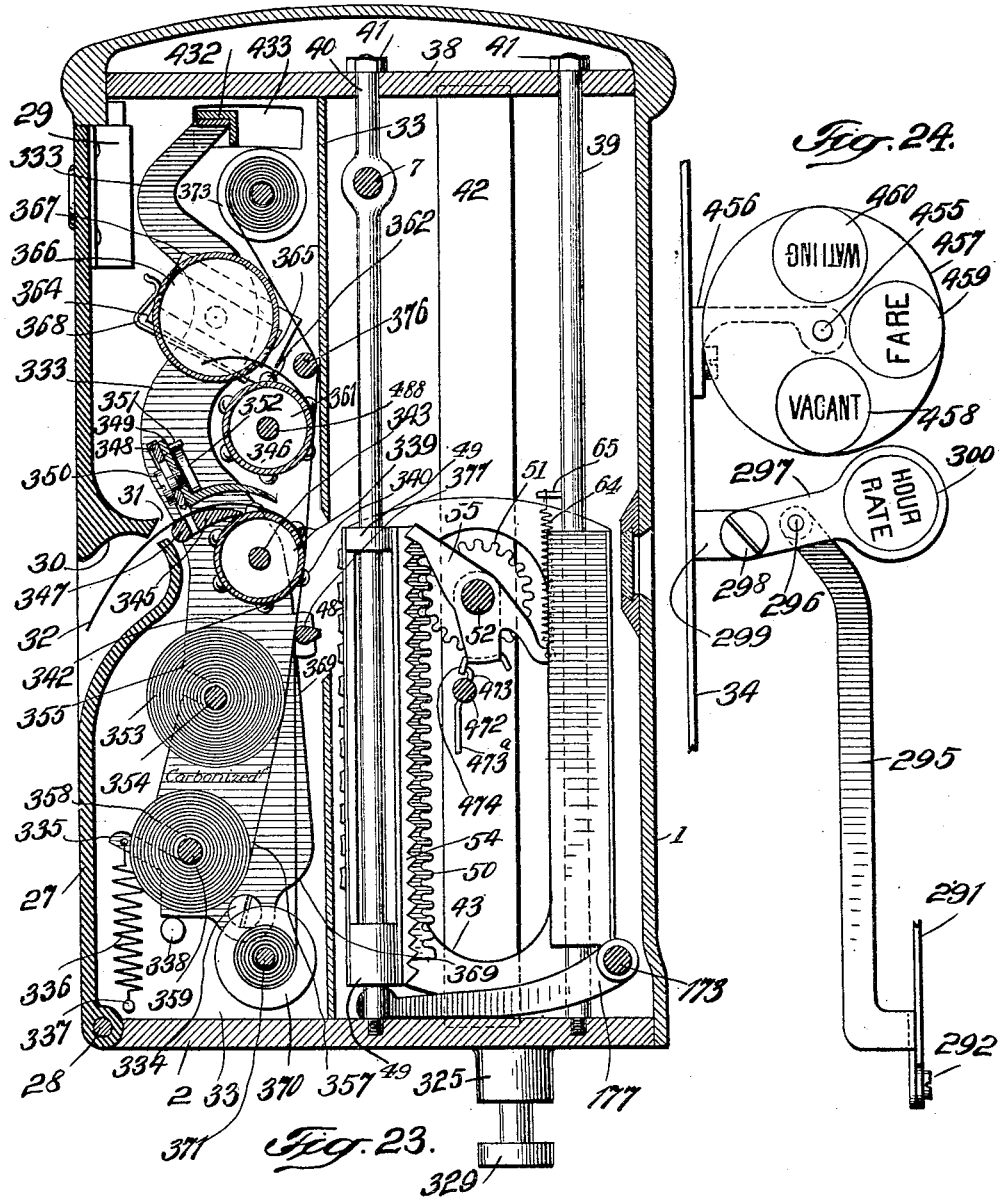

A. G. F. KUROWSKI.
RECORDING TAXIMETER.
APPLICATION FILED OCT. 21, 1916.
1,275,185.
Patented Aug. 6, 1918.
13 SHEETS—SHEET 7.
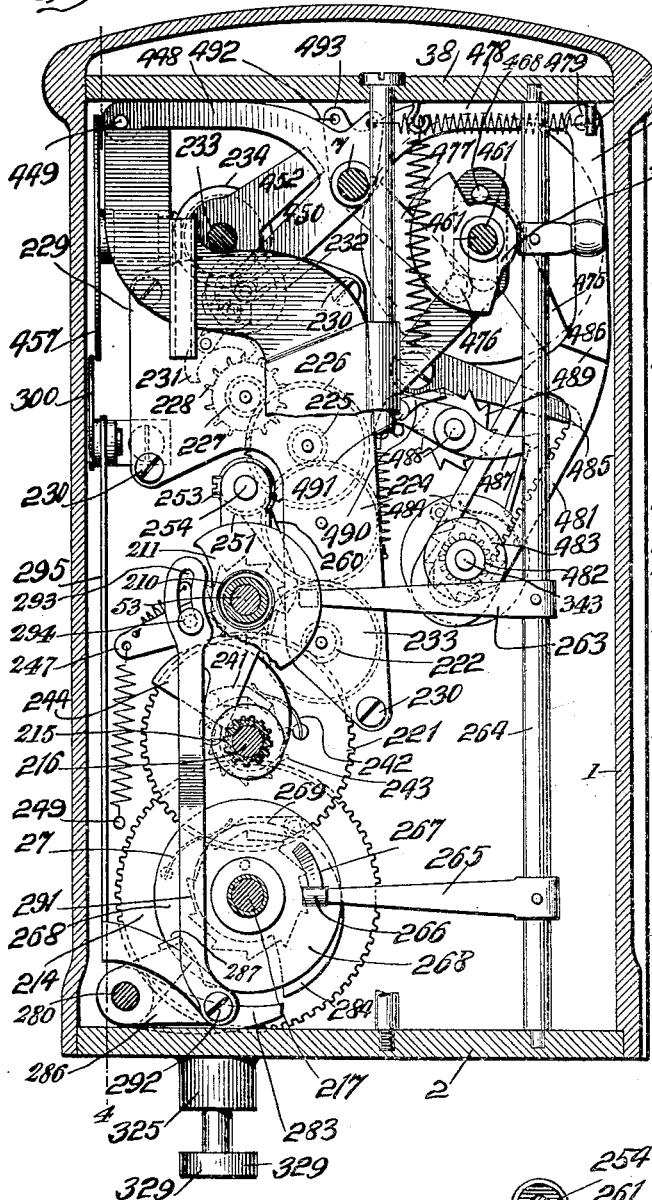
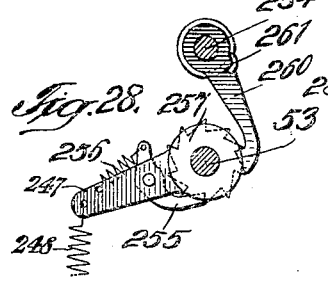
INVENTOR
Alfred G. F. Kurowski
BY
M. H. Lockwood
ATTORNEY

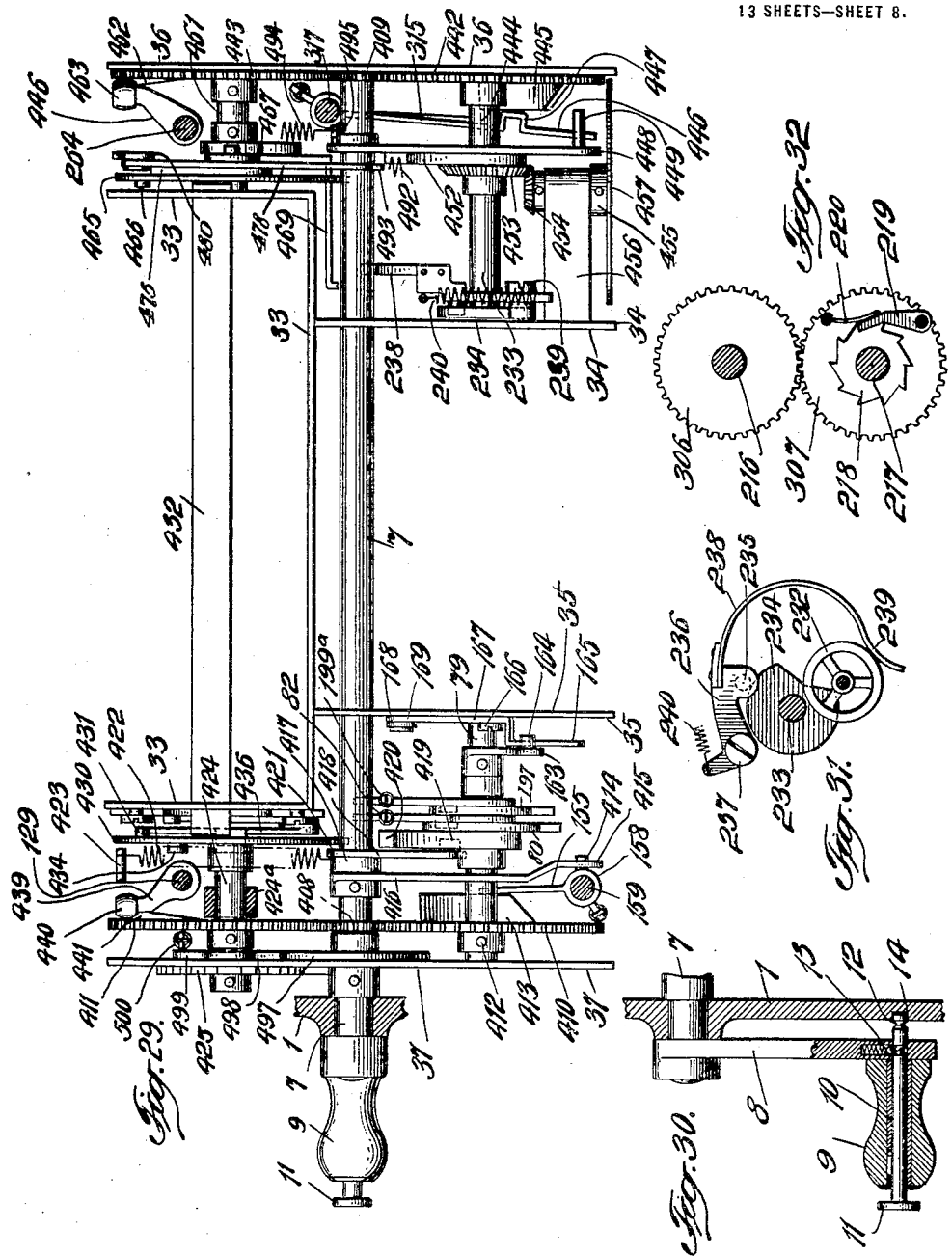

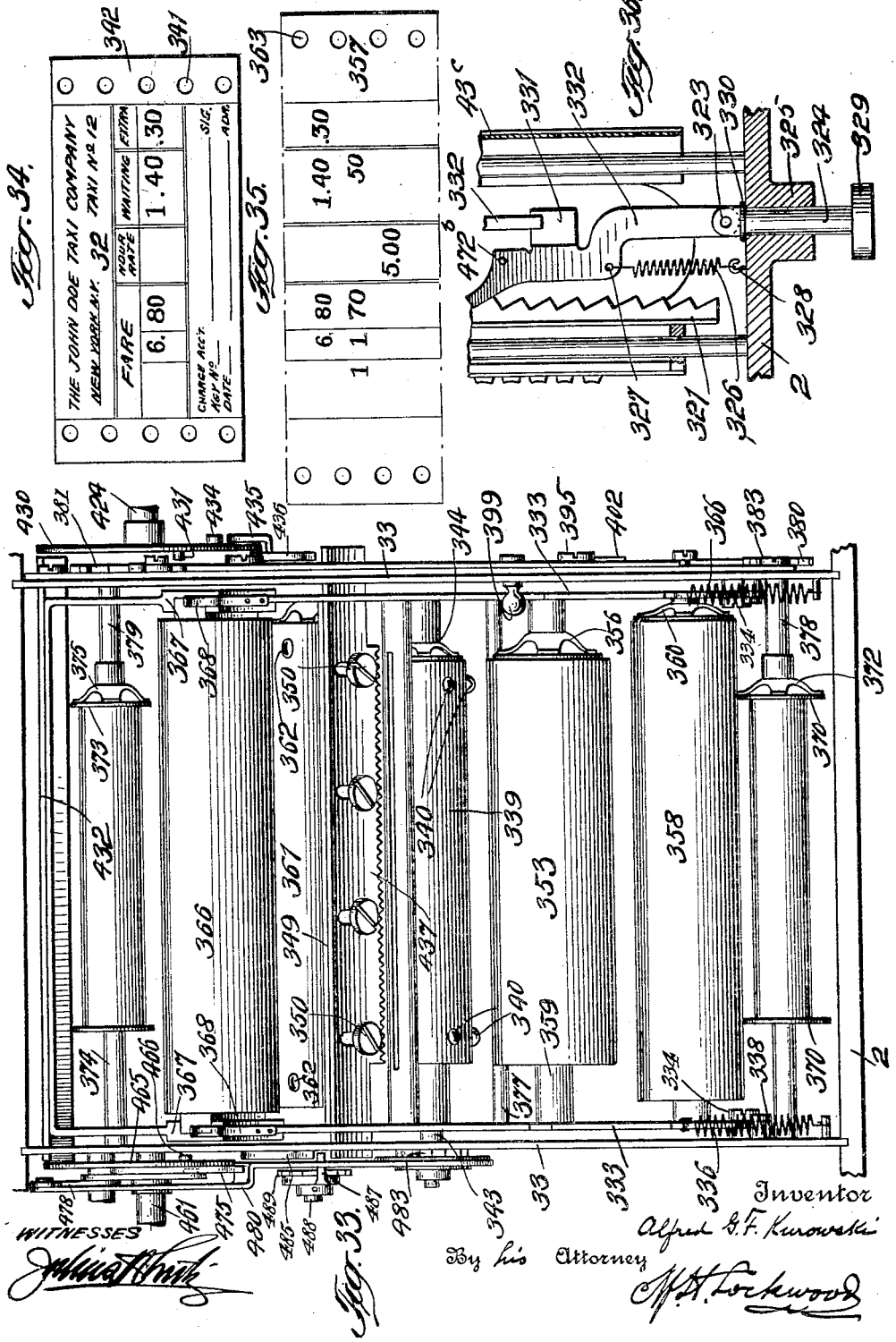

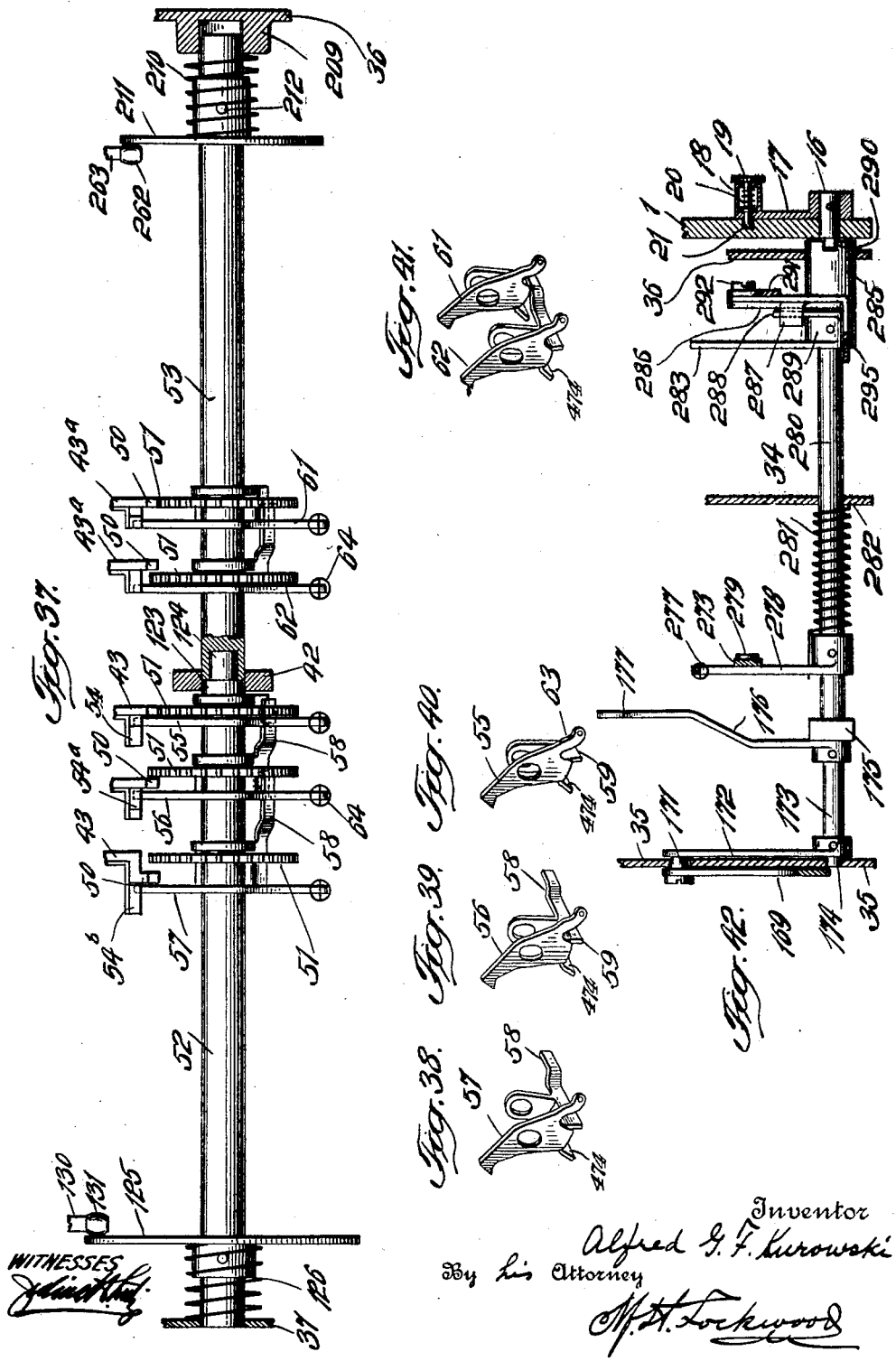

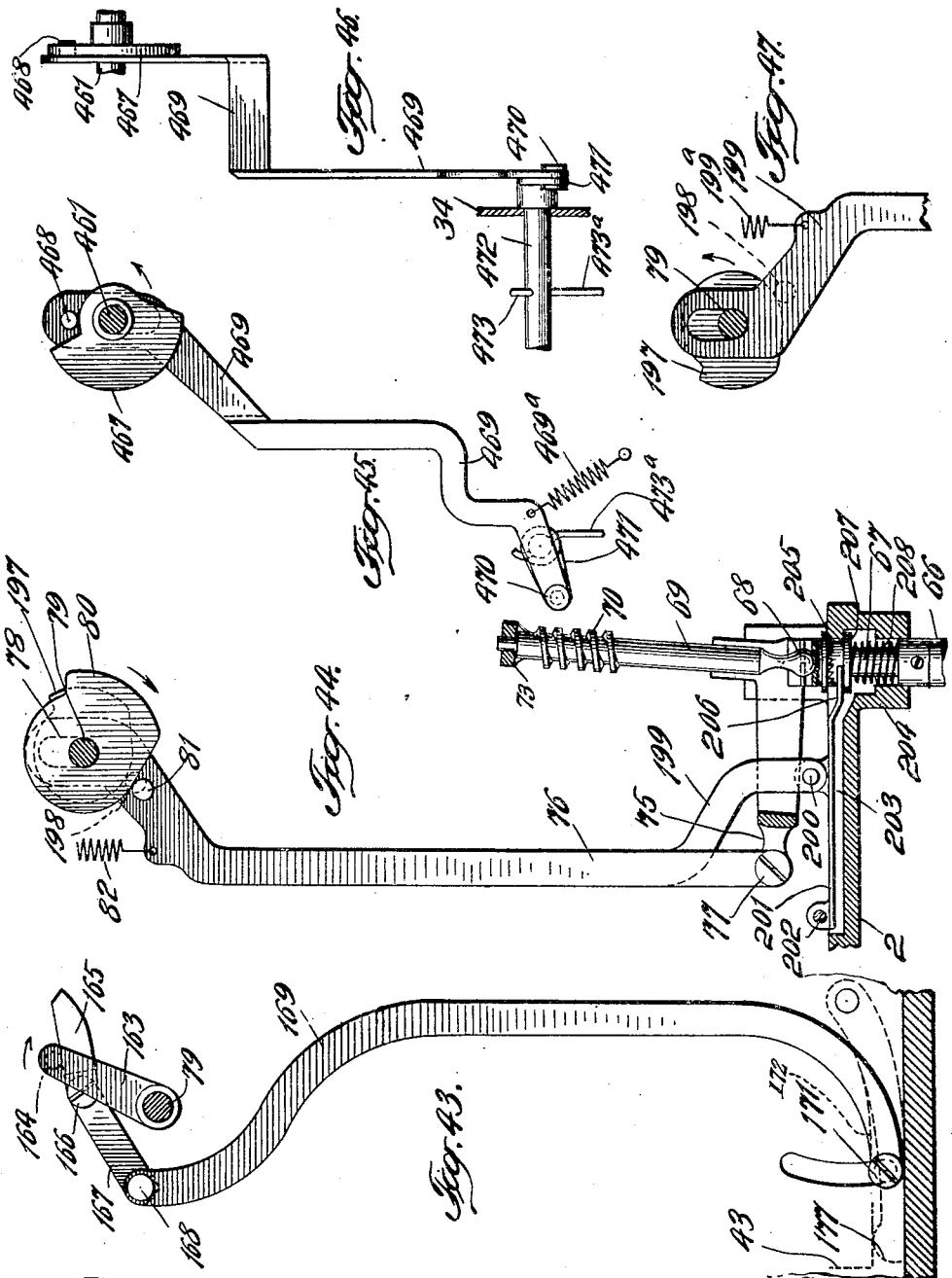

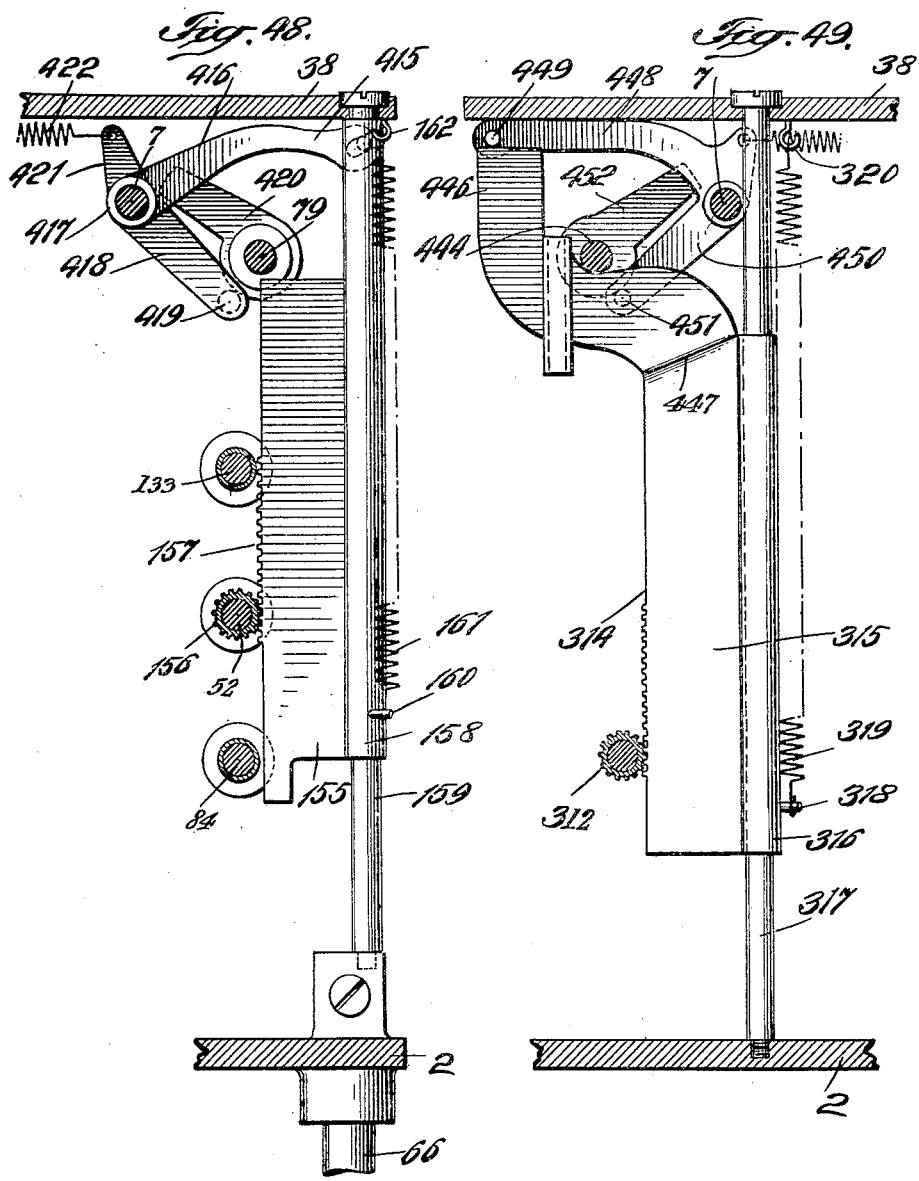

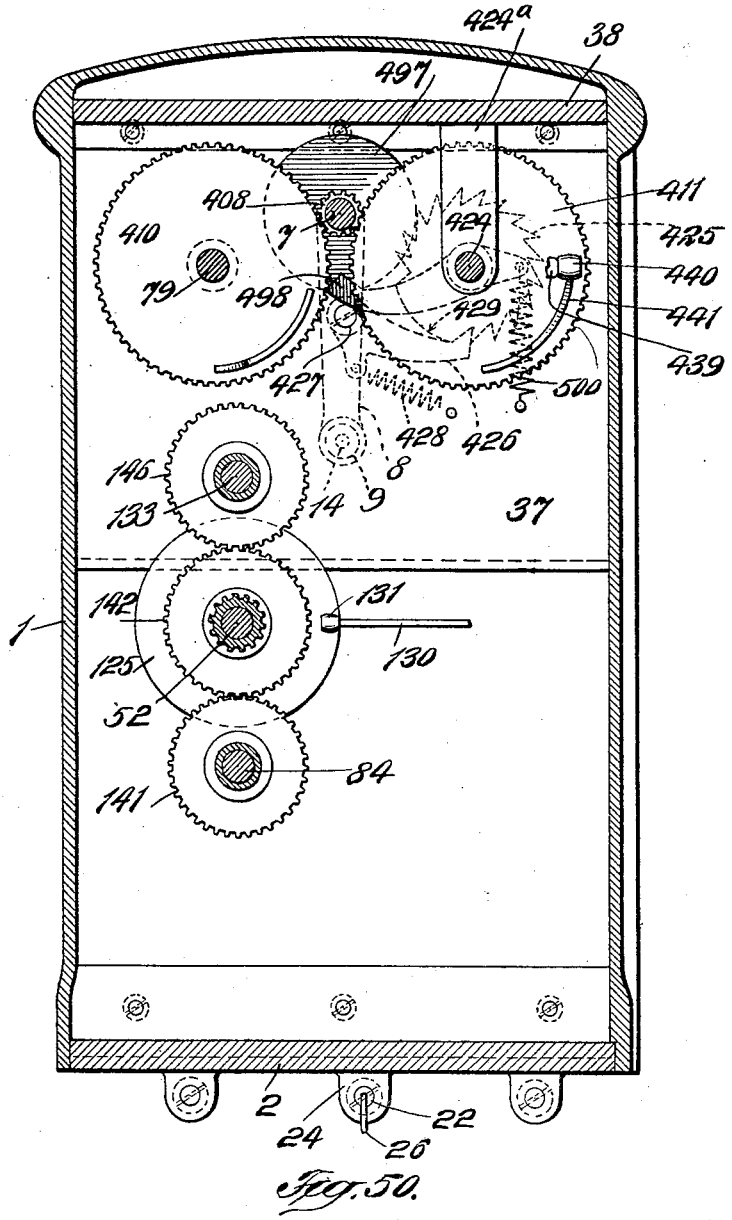

UNITED STATES PATENT OFFICE.

ALFRED G. F. KUROWSKI, OF BROOKLYN, NEW YORK, ASSIGNOR TO HIMSELF, HENRY MARX, AUGUST F. MARX, AND ADOLPH L. MARTIN, ALL OF CHICAGO, ILLINOIS.

RECORDING-TAXIMETER.

1,275,185.  Specification of Letters Patent.  Patented Aug. 6, 1918.

Application filed October 21, 1916. Serial No. 126,865.

*To all whom it may concern:*

Be it known that I, ALFRED G. F. KUROWSKI, a subject of the German Emperor, who have declared my intention of becoming a citizen of the United States, and a resident of Brooklyn, county of Kings, State of New York, have invented certain new and useful Improvements in Recording-Taximeters, of which the following is a specification.

My invention relates more particularly to taxi-meters for public hire in which a record is made of the charges and a ticket, upon which the charges are printed, is delivered to the passenger. The record made on the record strip gives the owner a chance to note at all times the amounts charged for fare, waiting, hour rate and other special charges, while giving each passenger a receipt for the amount paid. The object of my improvement is to simplify the mechanism wherever possible and construct a device to meet not only the legal requirements, but to facilitate the operation of printing and delivering the ticket to the passenger.

Another object is to enable the chauffeur or driver of the taxi-cab to readily shift the mechanism to record the charges, either as "fare," "waiting," or "hour rate" and a special register and recording section is provided for extra charges—such as for trunks, baggage or extra passengers. I also provide a total mileage register adapted to be brought into operation only while the vehicle is operating to register the fare.

Another object is to provide mechanism for permitting a predetermined minimum fare to be registered when the taxi-meter is placed in operation and the mechanism is so arranged that when the vehicle is "waiting" the driver by a single turn of the handle can disconnect the fare register and throw in the clock mechanism to operate the waiting register. This mechanism is so arranged that the worm which drives the fare register mechanism is not disconnected from the worm wheel, but the connection with the vehicle is broken by an intermediate clutch.

I have also embodied in my improved device simple means for utilizing the same clock movement to register either "hour rates" or "waiting" by simply shifting or rocking a rock shaft which automatically disconnects one mechanism and connects the other.

I have also provided improved mechanism operated by the handle for printing the amounts of the charges upon a record strip which remains permanently in the taximeter and on another strip from which a ticket is cut which may be delivered to the passenger as a receipt. The handle mechanism is also arranged to feed the paper, advance the ribbon, and cut off the ticket.

The handle is further provided with mechanism operated thereby for resetting the register frames to initial or zero position and restoring the transfer or carrying mechanism to initial position after printing the record as above indicated. I have preferably arranged the mechanism so that it requires eight complete turns of the handle to restore the mechanism to normal position to begin the registration of a new record of charges.

Various other objects and improvements will be described and more particularly referred to hereinafter. One form or embodiment of my improved taxi-meter is shown in the accompanying drawings, of which—

Figure 1 represents a front elevation.

Figs. 2 and 3 side elevations of the inclosed taxi-meter.

Fig. 4 is a front elevation with the front portion of the casing cut away and certain parts left off for clearness.

Fig. 5 is a detail of the worm.

Fig. 6 is a cross-section about on the line 6—6 of Fig. 4.

Figs. 7, 8, 9, 10, 11, 12, 13, 14, 15 and 16, on Sheet 3, are detailed views of parts of the mechanism.

Fig. 17 is a vertical section about on the line 17—17 of Fig. 4.

Fig. 18 is a perspective view of one of the register frames.

Fig. 19 is a vertical section about on the line 19—19 of Fig. 4.

Figs. 20 and 21 are details of the handle mechanism.

Fig. 22 is a cross-section of the ribbon feed mechanism about on the line 22—22 of Fig. 19.

Fig. 23 is a vertical cross-section about on the line 23—23 of Fig. 4.

Fig. 24 is a detail of the signal mechanism of the device.

Fig. 25 is a sectional view looking toward the left about on the line 25—25 of Fig. 4.

Fig. 26 is a detailed view of some of the clock-operating mechanism and switch.

Fig. 27 is a separate view of the hour rate mechanism and slide frame.

Fig. 28 is a detail of the ratchet and pawl mechanism operated by the clock.

Fig. 29 is a view of some of the parts seen when the top of the casing is removed substantially along the line 29—29 of Fig. 4.

Fig. 30 is a detail of the handle.

Fig. 31 is a detail of the balance wheel brake.

Fig. 32 is a detail of the clock mechanism.

Fig. 33 is a view from the rear with the casing removed showing the printing mechanism.

Fig. 34 represents the printed ticket such as would be delivered to the passenger.

Fig. 35 represents a portion of the record strip which remains in the casing.

Fig. 36 is a sectional detail of the mechanism for operating the extra fare frame.

Fig. 37 shows a separate view of the shafts, gears and pawls adapted to operate the fare and waiting slide frames, certain parts being shown in section.

Figs. 38, 39, 40 and 41 are perspective views of the pawls for retaining the slide frames in advanced position.

Fig. 42 represents the parts connected with the mechanism for switching the clock from waiting to hour rate.

Figs. 43, 44, 45, 46, 47, 48 and 49 are details of parts of the mechanism operated by the handle in restoring the device to initial position or for placing it in condition to register.

Fig. 50 is a vertical section along the line 17—17 of Fig. 4 looking in opposite direction to that of Fig. 17.

Figure 1:
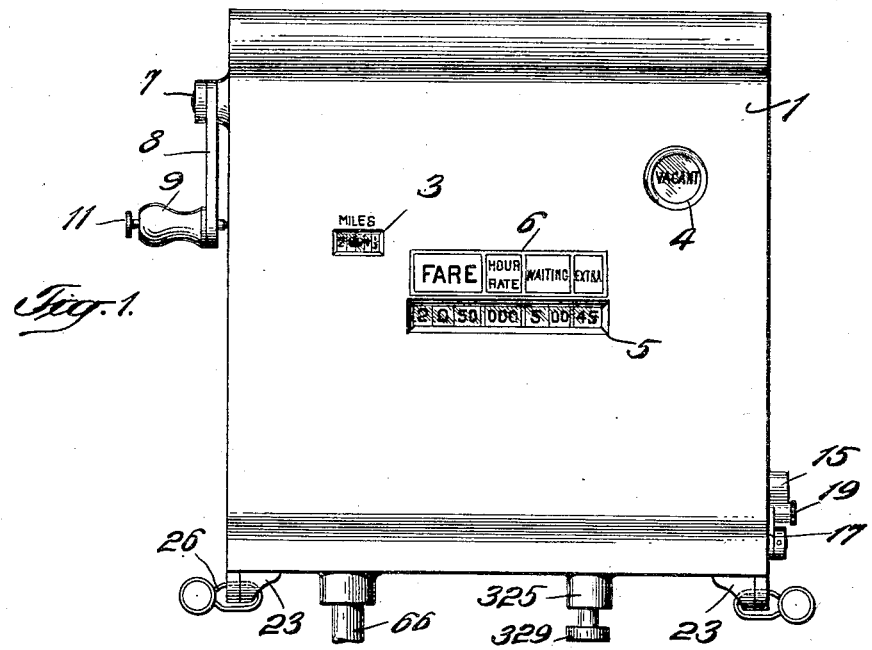

Referring to the drawings, 1 represents the outer casing of the taxi-meter which casing or cover is adapted to be removably secured to the base plate 2 which supports the mechanism. The casing 1 is preferably provided with sight openings at the front thereof, one at 3 (Fig. 1) being adapted to display the total miles, the opening 4 being adapted to display the signal, while the opening or window 5 is adapted to display the indications on the register mechanism. Above this window 5 I preferably inscribe over the appropriate register slides the words "Fare"—"Hour Rate"—"Waiting" and "Extra," as indicated at 6 in Fig. 1 so that any one observing the register can see at a glance the amount of the charges. This outer casing 1 is also provided with suitable openings or holes through which the various mechanisms may be brought into action. For instance, on the left side, as seen in Fig. 1, the handle shaft 7 protrudes and is connected with the crank arm 8 which is adapted to be turned to start the mechanism or restore it to normal position as hereinafter described. The handle is shown more particularly in Fig. 30 and is shown as provided with a knob 9 revolubly mounted upon a hollow or tubular spindle 10 through which a pin 11 is adapted to slide, the pin being provided with notches 12 at its inner end, as indicated in Fig. 30. These notches are adapted to coöperate with a ball and spring 13 which retain the pin in its inner position, as indicated in Fig. 30, or in its outer position when it is withdrawn from the cavity 14 which is located in the side wall of the outer casing 1. The object of this construction is to provide means for locking the handle in a fixed position during the operation of the machine.

Figure 2:
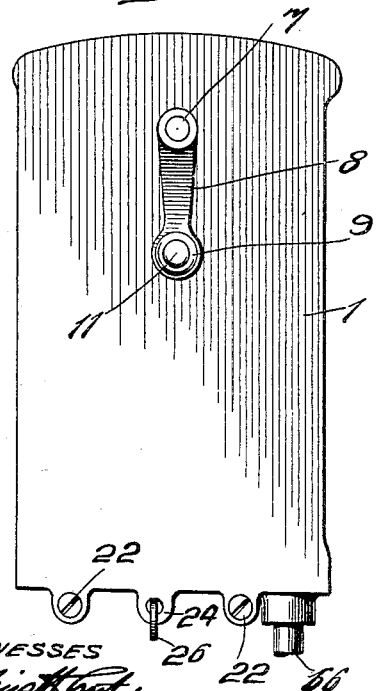
Figure 3:
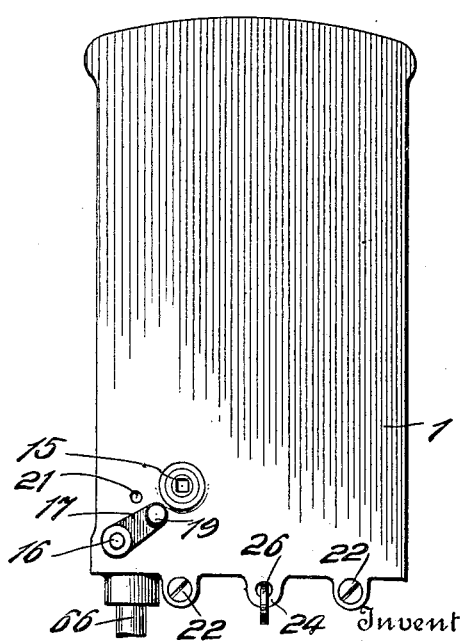

The other or right side of the machine is provided with two openings, one at 15 (see Fig. 3) for the insertion of the clock winding key, and another through which a stub shaft 16 protrudes to which a handle lever 17 is secured for operating the switch for changing from hour rate to waiting or vice versa. This crank handle is more particularly shown in Fig. 42, as provided with a spring knob 18 within which a pin 19 is slidably mounted and retained in position by a spring 20. The inner end of the pin 19 is adapted to coöperate with recesses or holes 21 in the side wall of the casing 1 so as to retain the mechanism in one position or the other, as will be more particularly described hereinafter. The casing 1 is preferably removable as a whole, but is secured to the base plate 2 by screws 22, as indicated in Figs. 2 and 3 of the drawings, the base 2 being provided with suitable depending lugs 23 for receiving the screws. Since taximeters are usually subject to inspection and certification by city authorities, it is necessary to provide means to prevent unauthorized persons from tampering with the mechanism and this is usually done by sealing the device. I have provided at 24 ears on opposite sides of the casing 1 adapted to coöperate with lugs 25 projecting from the lower side of the base plate 1 substantially as indicated in Fig. 4 of the drawings. The lugs 25 and the ears 24 are provided with holes adapted to coincide when the cover casing 1 is secured to the base plate by means of the screws 22 so that a seal 26 may be passed through the holes and the casing sealed so that unauthorized persons cannot obtain access thereto without breaking the seal. The rear part of the cover casing is preferably closed by a hinged door 27 pivoted at 28 to the base plate 2, as indicated in Fig. 23 of the drawings. This door is adapted to permit access to the printing mechanism only, for as hereinafter described, the mechanism is completely separate or contained in a separate compartment from the registering mechanism so that it is impossible for the registering mechanism to be tampered with by opening the door 27. A lock 29 is preferably provided for securing the door in closed position, the key to the lock being usually retained in the hands of the proprietor. The door 27 is provided with the recessed portion or hand cavity at 30 provided with a slit at 31 through which the ticket 32 is adapted to be projected when the handle is operated to print the record and restore the mechanism to normal.

Practically the entire mechanism is supported upon the base plate 2 and is divided into four principal compartments by means of vertical partitions. The open rectangular partition 33 (see Fig. 6) is adapted to separate and inclose the printing mechanism. The two vertical partitions 34 and 35 extend from the front to the cross partition 33 and inclose the register slide frames. The vertical outside frame plates 36 and 37, at each side of the machine, form the supports for some of the parts and inclose the compartments containing the clock mechanism and the mechanism driven from the vehicle, as more fully described hereinafter. The inside frame of the mechanism is completed by a top plate 38, as indicated in Figs. 6, 17, 19, 23 and 25. The various partitions and frame plates are held in position by vertical rods 39 and 40 which are preferably threaded at their lower ends and take into the base plate 2, as indicated in Fig. 23 of the drawings, the upper ends being provided with nuts 41 whereby the top plate is secured in place upon the partition plates. An additional partial partition or strip 42 extends between the base plate 2 and the top plate 38, as indicated in Figs. 4, 6 and 23, which is adapted to serve as a support for the ends of the divided shaft hereinafter described in connection with the mechanism of the register frames.

The plurality of register frames are mounted to slide vertically upon the rods 39 and 40 in any suitable manner. The register frames 43 preferably comprise a bent sheet metal portion provided with a longitudinal opening at 44 through which the shafts for operating the respective slides may extend transversely of the slides. One of the fare register slides is shown in perspective in Fig. 18 where it will be seen that the sheet metal is bent in a rectangular form at 45 so as to inclose one of the rods 39 and slide thereon, the front face 46 of the slide frame being provided with characters adapted to indicate the units of charge, as, for instance, ten, twenty, thirty and so on up to ninety cents. The rear portion of the slide at 47 is parallel to the face 46 and is provided with a plurality of type characters 48 (see Figs. 6, 23, and 27). Lugs 49 extend forward at the top and bottom of the bent-over portion 47 of the respective slide frames 43 and are provided with holes therethrough to slide upon the vertical rods 40, as indicated in Figs. 18 and 23. Secured to the rear inner portion of each of the slides is a gear rack 50 adapted to coöperate with one of a series of gear wheels 51 (see Figs. 6, 23 and 37). The gear wheels 51 are mounted upon shafts adapted to be rotated either by the vehicle or by the clock, as hereinafter described. When the gears 51 are rotated the racks 50 will be moved if in mesh with the corresponding gears, but as will be seen in Figs. 6 and 37, only one of the frames 43 is in coöperative relation with one of the gears 51 on each of the respective shafts 52 and 53 so that when one of the shafts is rotated, but one slide frame will be advanced at a time. The shaft 52 is adapted to be rotated from the vehicle in the manner hereinafter described, while the shaft 53 is adapted to be rotated by the clock mechanism as hereinafter described. Each slide frame 43 is also provided with a longitudinally extending ratchet rack 54 with which a suitable pawl is adapted to coöperate to retain the slide frame in advanced position whether the gear 51 is in mesh with the corresponding rack 50 or not.

"*Fare*" *register.*—As will be seen in Fig. 37, the gears 51 secured to the shaft 52 are closer together than are the racks 50 secured to the corresponding register frames 43, the spacing being such that only one of the racks can be in mesh with its corresponding gear at a time. The shaft 52 is preferably slidable transversely of the frames 43, so that one or another of the frames 43 may be brought into mesh with the corresponding gear 51 by sliding the shaft 52. The object of this arrangement is to facilitate transferring the tens. Normally, the right hand gear 51 on the end of the shaft 52 is in mesh with the units "fare" register frame and is adapted to advance the same step by step until 90 is registered. Then the shaft 52 will be shifted one step to the left, thereby bringing the second gear 51 into mesh with the corresponding tens rack 50 and this frame will be advanced one step while the units frame will be released and permitted to return to zero. This last-mentioned operation is preferably accomplished by releasing the pawl 55 coöperating with the units register frame rack 54. The three pawls coöperating respectively with the units, tens and hundreds fare slide frames are represented in perspective in Figs. 38, 39 and 40, the pawl 55 being adapted to coöperate with the units rack, the pawl 56 with the tens rack and the pawl 57 with the hundreds rack. It will be seen that the pawls 56 and 57 are provided with laterally extending lugs or tails 58 adapted to overlie, respectively, a depending portion 59 of the pawls 55 and 56 to the right, so that when the pawl 56, for instance, is lifted by the sliding of the tens slide frame, the tail 58 will operate upon the lug 59 of the pawl 55 and lift the latter out of engagement with the corresponding rack 54 of the units frame, thus releasing the latter, which by gravity will drop to normal zero position. In this manner the transfer of the tens is accomplished. Similarly, when the tens slide frame reaches 9, the shaft 52 is again shifted to the left but shifted two spaces this time, so as to bring the corresponding gear 51 into mesh with the rack 50 of the hundreds register frame. When the next impulse is given to the shaft 52 the hundreds frame will be advanced and its retaining pawl 57 will be lifted. The tail piece 58 on the pawl 57, by coöperation with the lug 59 on the pawl 56 will lift the latter, and the tail piece 58 on the pawl 56 by coöperation with the lug 59 on the pawl 55 will lift the latter, thus the movement of the pawl 57 will lift both pawls 56 and 55 and release the tens and units slide frames and permit them to return to zero. It will be noted that after each single step advancement of either the tens or the hundreds slide frames, the gear 51 corresponding with the units slide frame will reëngage the latter in order that continued accumulations may be registered thereon. In order that the slide frames 43 may be released by lifting the respective pawls 55, 56 and 57, as hereinbefore described, the pawls are preferably pivotally mounted upon the shaft 52 and slidable transversely of the register frames with the respective gears 51 which are secured to the shaft. The racks 54 of the units, tens and hundreds slide frames 43 are of different width so that when the shaft 52 is slid toward the left one step only the units pawl 55 will be out of the field of the corresponding rack 54. The lower teeth of the rack, however, at 60 (Fig. 18) are preferably of the full width so that when the pawl 55 slides to the left the corresponding frame 43 is not released but is held by the pawl 55 engaging the wide tooth 60. When the pawl 55 is lifted by the tail 58 of the tens pawl 56, the units slide frame is released and since the pawl 55 is out of the field of the rack 54, the units frame can drop to normal zero position. The same thing occurs when the shaft 52 is shifted two spaces to engage the hundreds register frame, the units pawl 55 still is adapted to engage the wide tooth 60. The corresponding ratchet rack 54ª on the tens slide frame is two spaces wide or double the width of the units rack, so that its pawl 56 does not clear the rack until the shaft 52 is slid two spaces to the left. The ratchet rack 54ᵇ of the hundreds register frame is three spaces wide so that the corresponding pawl 57 never gets out of the field of the hundreds ratchet rack.

"*Waiting*" *register.*—The register frames 43ª are adapted to register "waiting" and are intermittently advanced from the clock mechanism by turning the shaft 53. This shaft is longitudinally shiftable like the shaft 52, but in the opposite direction for convenience of construction. For this reason the corresponding gears 51 secured thereto are spaced so as to normally engage the units frame and permit engagement of the tens frame by shifting the shaft 53 toward the right, as will be seen in Fig. 37 of the drawings. Corresponding pawls 61 and 62 coöperate respectively with the units and tens register frames of the waiting section and are adapted to operate substantially in the manner described for the pawls 55, 56 and 57 and their coöperating racks 54, 54ª and 54ᵇ. I have provided only units and tens slide frames for the waiting charges and hence the shaft 53 is adapted to slide but one space to transfer the tens. Each of the pawls 55, 56, 57, 61 and 62, are provided with tail pieces or arms 63 to each of which a spring 64 is secured in any suitable manner and adapted to urge the points of the respective pawls into engagement with the corresponding racks. The opposite ends of the springs are secured to suitable fixed portions of the mechanism, as, for instance, the pins 65 (Fig. 27) projecting inward from the slide rods 39. The shafts 52 and 53 are adapted to be rotated intermittently or step by step to advance the register frames, as above described.

The shaft 52 is adapted to be connected with and driven from the vehicle. A flexible shaft 66 is connected with the running gear of the vehicle in the usual or any prefered manner and extends to and is connected with the lower end of a stub shaft 67 (see Figs. 4, 5 and 44). The stud shaft 67 is preferably connected at 68 to the lower end of a worm shaft 69 carrying the worm 70 (see Figs. 5 and 44). The worm shaft is pivoted in a rock frame comprising the lower rock frame 71 pivoted to bearing lugs 72 projecting upward from the lower base plate 2 of the instrument. This rock frame 71 is preferably connected with the upper pivoted bearing 73 of the worm shaft by leaf springs 74 so that if the worm 60 does not immediately mesh with the teeth of the worm gear the spring arms will give until the shaft has turned the worm into position to engage the teeth of the worm gear. The rock frame 71 has an inwardly extending rock arm 75 to which a link 76 is pivoted by a screw 77, the upper end of the link being provided with an elongated slot at 78 (Fig. 44), adapted to slide upon the shaft 79 hereinafter referred to as connected with the handle operated mechanism. This shaft 79 carries a cam 80 adapted to coöperate with a pin 81 secured to and projecting from the link 76 in position to thrust the link downward when the shaft and cam 80 are rotated by the handle in a clockwise direction. (See Fig. 44). A spring 82 connected to the link 76 and to a fixed portion of the frame of the instrument is adapted to urge the link upward and throw out the worm 70. It will be seen from Figs. 4, 6 and 17, that the worm 70 is adapted to coöperate with a worm gear 83 revolubly mounted upon a shaft 84 finding pivotal bearings in the partition 35 and the side plate 37, as indicated in Fig. 4 of the drawings. The worm wheel 83 is preferably loosely mounted upon the shaft 84 in order that it may rotate a predetermined amount without turning the shaft when the worm is first thrown into mesh therewith, the object of this arrangement being to permit advancing the units "fare" register frame a predetermined amount representing the minimum charge. To accomplish this the worm gear 83 (see Figs. 7 and 8) is bored out and provided with an annular groove at 85 in which a lug 86 projects. The worm gear is further bored out or chambered at 87 to form a spring barrel to receive a coiled spring 88, one end of which is secured at 89 to the spring barrel or worm gear 83. The other end of the spring 88 by means of a pin 90 is secured to a disk 91 provided with a hub 92. The disk 91 is secured to the shaft 84 by means of a pin 93 and is provided with a pin or lug 94 adapted to project into the annular groove 85 and engage the lug 86 therein when the worm gear 93 has been revolved practically one complete turn. The shaft 84 is preferably provided with a small pinion 95 secured thereto and adapted to mesh with a spur gear 96 (see Figs. 4 and 17) revolubly mounted upon the shaft 52, hereinbefore referred to as the shaft carrying the spur gears 51 adapted to move the "fare" register frames step by step. As will be seen in Figs. 13 and 14, the spur gear 96 is provided with a hub 97 which has secured thereto a disk 98 carrying a pawl 99 and an actuating spring 100 adapted to hold the pawl in engagement with a ratchet wheel 101 secured to a mutilated gear disk 102 carrying a single tooth 103 and a wedged cam 104, as will be seen in Figs. 11 and 12 of the drawings.

The opposite side of the spur gear 96 is provided with a projecting annular ring 105 which acts as a spring barrel for a light spring 106 (see Fig. 14), one end of which is secured to the barrel by entering a slot 107 while the other end of the spring at 108 is bent radially inward adapted to enter a notch 109 in the hub 110 of a star wheel 111, shown in Fig. 15 of the drawings, the connection being similar to that at 107, Fig. 14. The star wheel 111 is preferably provided with ten notches 112 on its periphery and two circumferential slots 113 adapted to receive screws 114 passing therethrough and entering screw holes 115 in the annular ring 105, as indicated in Figs. 4 and 14. The hub 110 of the star wheel 111 is preferably provided at 116 with an elongated slot adapted to receive a pin 117 passing through the shaft 52, as indicated in Fig. 4 of the drawings. It will thus be seen that when the star wheel 111 is turned, the shaft 52 for actuating the "fare" register frames will be turned. It is desirable that the register frames shall be moved or advanced step by step only at the completion of a predetermined run of the vehicle. This is accomplished by the intermittent action of the spring 106 in conjunction with the pin-and-slot connection between the gear 96 and the star wheel 111. Thus, if the star wheel 111 is prevented from rotating while the gear 96 is rotated one-tenth of a complete rotation or the distance between the notches 112 in the star wheel and then the star wheel is released, the spring 106 will suddenly actuate the star wheel a tooth space and turn the shaft 52 one-tenth of a revolution and thereby advance the register frame with which it is in mesh one step.

In the device here shown, the unit of charge is preferably one-third of a mile and I have so proportioned the parts that the worm gear 83 will complete one revolution when the vehicle travels one-third of a mile. The spaces between the notches 112 of the star wheel 111, therefore, represent a third of a mile. To lock and release the star wheel at every third of a mile, the shaft 84 which is actuated by the worm gear 93 in the manner hereinbefore described, carries a disk 118 provided with a notch at 119 adapted to coöperate with the toe 120 of a rock lever or dog pivoted at 121 to the partition wall 35 as will be seen in Figs. 4, 17 and 19 of the drawings. The rock lever has another arm or dog 122 extending upward, the end of which is adapted to coöperate with the notches 112 in the star wheel 111, as will be seen in Figs. 17 and 19 of the drawings. When the disk 118 is rotated counterclockwise, as seen in Fig. 19, the notch 119 therein, at the completion of one rotation of the disk, will permit the nose 120 of the pawl lever to drop into the notch (119) which it will do under pressure of the star wheel 111 against the other end 122 of the rock pawl thereby permitting the star wheel 111 to turn one tooth space upon the slots 113 which, as hereinbefore described, are adapted to permit the spring 106 to turn the star wheel this amount.

*Transfer of tens.*—When the shaft 52 has turned nine steps when in gear with the units "fare" register frame 43, it then becomes necessary to restore the units frame to zero position and carry the tens or advance the dollar register frame one step. This I accomplish in my present mechanism by shifting the shaft 52 so as to disconnect the gear 51 from the corresponding rack 50 of the units register frame and engage the respective gear 51 with the rack 50 of the tens or dollars register frame. This is preferably accomplished by mounting the shaft 52 so that it is slidable longitudinally in its bearing. The inner end of the shaft at 123 finds bearing in the partition strip 42 and has its end turned down at 124, the latter telescoping into the bored out end of the shaft 53, as indicated in Fig. 37 of the drawings. This construction permits a longitudinal movement of either shaft. Near the outer end of the shaft 52, I preferably secure thereto a disk 125 against which a spring 126, surrounding the shaft, is adapted to press, the opposite end of the spring exerting pressure against the side frame member 37, as will be seen in Figs. 6 and 37 of the drawings. The spring 126, therefore, will tend to keep the shaft to the right with the units gear 51 in mesh with the units register frame.

The disk 102 hereinbefore referred to (see Figs. 11, 12 and 13) is provided with a cam 104 adapted to coöperate with a roller 127 on the end of a rock arm 128 secured to a rock shaft 129 pivotally mounted between the base plate 2 and the top plate 38, as will be seen in Fig. 17 of the drawings. This rock shaft 129 is also provided with another rock arm 130 secured thereto and extending forward, provided with a roller 131 adapted to coöperate with the disk 125, as shown in Figs. 6 and 17, the arrangement being such that when the roller 127 passes over the cam 104, the rock shaft 129 will be rocked and the arm 130 will be proportionally thrown outward and by its engagement with the disk 125 will move the shaft 52 toward the left one space or a sufficient distance to disengage the units register frame and engage the tens or dollar register frame. The cam 104 is so located that it will actuate the rock arm 128 immediately after the shaft 52 has turned the ninth step. Therefore, by the time the disk 118 has completed its tenth revolution, the dollar register frame is on the gear with the shaft 52 so that the next tooth space jump of the star wheel 111 will be transmitted to the dollar register frame and advance it one step.

In advancing the dollar register frame one step in this manner the pawl 56 coöperating therewith will be lifted and by means of the tail 58 connected therewith the pawl 55 of the units register frame will simultaneously be lifted and since the latter frame is out of gear with its corresponding gear 51, the units frame will be free to drop or return to normal zero position. Before the next actuation of the shaft 52 by the release of the star wheel 111, the roller 127 will pass off the cam 104 and the shaft 52 will under the pressure of the spring 126 be restored to normal position with the units gear 51 in mesh with the corresponding units register frame, after which accumulation will continue on the units frame until nine or ninety is again passed when the operation of shifting the shaft 52 will be repeated.

When the tens register frame has advanced nine steps it is necessary to transfer the tens to the next or hundreds register frame and permit the tens register frame to return to zero position. This I accomplish by means of the single tooth disk 102 (Figs. 11 and 12) the single tooth 103 being adapted to engage a Geneva gear 132 pivoted on a shaft 133 and carrying a wedge cam lug 134. This lug is carried by a disk 132$^a$, as will be seen in Figs. 4 and 17. The disk 102, being connected with the star wheel 111 through the ratchet and pawl 99 and 101, hereinbefore referred to, will be rotated once for every ten steps of the star wheel and hence the single tooth 103 of the disk will engage the Geneva wheel 132 and advance it one-tenth of a revolution for every complete revolution of the star wheel 111. Therefore, when the star wheel 111 has completed ten revolutions, the wedge cam 134 will pass under a roller 135 at the end of an arm 136 secured to the rock shaft 129 and the latter will be rocked to move the shaft 52 toward the left two spaces so as to bring the hundreds register frame 43 into gear with the corresponding gear wheel 51 on the shaft 52. When this occurs it will be seen that the next or hundredth step by step jump of the star wheel 111 will advance the hundreds register frame one step. When this occurs the corresponding pawl 57, coöperating therewith, will be actuated and by means of the tail 58 connected therewith; the pawl 56 to the right will be lifted and the latter will lift the pawl 55 thus releasing the units and tens register frames so that they can return to normal zero position while the hundreds frame is advanced one step.

When a run has been completed it is desirable to reset the register frames to zero position and in order that the gears and cams, hereinbefore described as utilized in carrying the tens shall also be restored to initial position, I provide handle actuated means for accomplishing this. The worm gear shaft 84, as will be seen in Figs. 4, 6 and 17, has, secured thereto, a hub disk 137 provided with a lateral extending pin or single tooth 138, while upon the shaft is loosely mounted a hub collar 139 carrying a single tooth 140 extending in the opposite direction to the tooth 138 and adapted to engage the latter when the hub 139 is slid longitudinally of the shaft. The engaging members 138 and 140 are normally separated so that one may rotate without engaging the other. The hub 139 preferably has mounted thereon, or secured thereto a gear 141 adapted to mesh with a similar gear 142 secured to a hub 143 and revolubly mounted upon the shaft 52, as will be seen in Figs. 4 and 6 of the drawings. The hub 143 is, like 139, provided with a laterally projecting pin or tooth 144 adapted when the hub and gear are shifted longitudinally of the shaft 52 to engage an oppositely extending pin 145 projecting from the disk 102 (Figs. 11 and 12) hereinbefore referred to as carrying the cam 104 adapted to rock the shaft 129 when carrying tens. The ratchet and pawl connection (99—101) permits rotating the disk 102 independently of the gear 96. The gear 142 also engages a gear 146 secured to a hub 147 revolubly mounted upon the shaft 133 upon which the Geneva gear 132 revolves. The Geneva gear 132 is connected with the disk 132$^a$ by means of a pawl 148 and ratchet 149 so that the cam wedge 134 may be rotated independently of the Geneva gear in resetting the wedge cam to normal zero position. The disk 132$^a$ is preferably provided with a laterally extending pin 150, adapted to be engaged by a corresponding pin 151 projecting from the hub 147, when the latter is moved longitudinally upon the shaft. Suitable springs 152—153 and 154 are adapted to normally keep the respective clutch or engaging pins 150—151, 144—145 and 140—138 apart except when it is desired to return the parts to normal position.

To simultaneously engage these resetting clutches and turn them a predetermined amount, I provide each of the hubs 139, 143 and 147 with a circumferential groove in which a rocking plate 155 is adapted to slide. The middle hub, as will be seen in Figs. 4 and 48, is provided with a pinion 156 at the bottom of the annular groove therein, adapted to be engaged by rack teeth 157 on the edge of the sliding plate 155 (see Fig. 48). Thus, if this plate 155 is rocked or moved transversely, the various hubs 139—143 and 147 will be slid upon their respective shafts so that the associated engaging pins or clutch teeth will be in a position to engage the corresponding clutch teeth of the parts to be returned to zero. If then the plate or rack 155—157 is caused to move downward the hubs will be rotated, by means of the gears 141, 142 and 146, the proper amount to bring the respective parts to their proper positions. The plate 155 is preferably provided with a tubular portion 158 adapted to surround a rod 159 (Fig. 48) upon which the plate 155 may rotate and slide as required. The plate is preferably provided with a projecting lug or pin 160 to which a spring 161 is attached, the opposite end of the spring being connected to a hook 162 secured to the top plate 38 of the instrument. The spring 161 is adapted to restore the plate rack 155 to normal position after it has been pushed downward to restore the parts described to normal zero position. The rack plate 155 is adapted to be rocked from the handle in a manner to be hereinafter more fully described.

*Minimum charge.*—The object of providing for a certain amount of idle motion of the worm gear 83, as hereinbefore described, is to permit the preliminary charge of a minimum amount by lifting the units register frame independently of any motion of the vehicle. This is accomplished from the handle by means of an arm 163 (see Figs. 19 and 43) secured to the handle-operated shaft 79 and provided with a laterally projecting pin 164 adapted to engage one arm 165 of a bell-crank lever pivoted at 166 to the partition wall 35, the other arm 167 of the lever being pivotally connected at 168 to a link 169 extending downward along the side of the partition 35. The partition 35 at 170 is provided with a slot of arc-shape through which a shoulder screw 171 projects, the lower end of the link 169 being connected by means of the screw 171 with a rock arm 172 (see Fig. 42) preferably secured to a short rock shaft 173 pivoted at 174 in the partition 35. The opposite end of the shaft 173 is pivoted in a lug 175 projecting upward from the base plate 2, as will be seen in Fig. 4 of the drawings. The rock shaft 173 is provided with a rearwardly extending arm 176 the inner end of which at 177 (see Fig. 43) is adapted to rest under the units "fare" register frame 43, the proportions of the parts being such that when the rock shaft 173 is rocked by means of the link 169 the units register frame will be lifted a sufficient amount to register the minimum charge. The idle movement of substantially one revolution, permitted the worm gear 83, will prevent further actuation of the units register frame until the predetermined distance has been covered by the vehicle.

*Total miles.*—It is desirable in taximeters of this character to keep a record of the total mileage traveled under "fare" charges and for this purpose I have mounted a cyclometer or counting device in one of the compartments. This is represented at 178 (see Figs. 4, 17 and 19). Since the unit or basis of fare charges is one-third of a mile, the first wheel of the counting device 178 is adapted to register thirds of a mile. A rock arm 179 is preferably secured to the shaft of the counting device and adapted to advance the right hand wheel thereof one step at each operation of the crank arm 179. The counting device 178 is preferably secured to the inner partition plate 35 by an angle bracket 180 secured thereto, as indicated in Figs. 4, 17 and 19. Slidably mounted transversely of the shafts 52 and 133 is a slide plate 181 provided with elongated slots 182 and 183 (see Fig. 19), whereby the slide 181 is permitted a reciprocating movement. A spring 184 is preferably secured at 185 to the slide 181 and at 186 is secured by a pin to the partition plate 35, the spring being adapted to hold the slide 181 in its upper or normal position, as indicated in Fig. 19. The slide 181, at its lower end, is provided with a pawl 187 pivotally connected thereto at 188 and held in the position indicated in Fig. 19 by a spring 189 and a limiting stop or lug 190 projecting from the slide plate 181. The lower end of the pawl 187 at 191 is hook-shaped and adapted to be engaged by a pin 192 projecting laterally from the worm gear 83 (see Figs. 7 and 8). By this arrangement it will be seen that when the worm gear 83 is rotated counterclockwise the pin 192 will engage the hook 191 and draw the slide 181 down a predetermined amount at each revolution of the disk. The pin 192 will ride off the hook 191 after the slide has been drawn down the prearranged amount. The upper end of the slide 181 is provided with a forwardly projecting arm 193 provided with a slot at 194 adapted to engage a pin 195 on the rock arm 179 which actuates the counting device 178 in the usual manner. Thus each revolution of the worm gear 83 will cause the registration of one-third of a mile upon the counting device 178. The nose of the pawl 187 at 196 is preferably beveled so that should the worm gear 83 be revolved in the opposite direction, the pin 192 will pass the pawl without obstruction.

"*Waiting*" *register.*—I have thus far described more particularly the "fare" registering mechanism located principally in the left hand compartment of the instrument and operating upon the three register frames 43 at the left under the designation "fare" in Fig. 1 of the drawings. For registering "waiting time" and "hour rate" a clock mechanism is required and this is located in the right hand compartment of the instrument. Before describing this mechanism more fully, however, it is well to call attention to the device for throwing out the "fare" register at the time the clock mechanism is to be used. When the vehicle is "waiting" the driver should turn the handle 9 one turn in order to cut out the fare register and start the clock register. Since it may be necessary to reverse the operation after a certain waiting time has been recorded, the handle is adapted to be turned in the opposite direction to reëngage the fare registers and cut out the waiting registers. During this operation it is not desirable that the worm 70 be withdrawn from the worm gear 83, for if it were, the spring 88 in the worm gear 83 would restore the latter to initial position and then if reëngagement takes place the prearranged idle movement of the worm gear would take place and the correct fare would not be registered. To avoid this I provide a special ratchet clutch mechanism on the stub shaft 67 which not only permits the shaft 66 to revolve the worm in one direction only, but by suitable connections the clutch is disconnected or opened when the register is turned to "waiting", and the worm 70 remains in mesh with the worm gear 83. Referring more particularly to Fig. 44, it will be seen that the shaft 79 carries an additional cam 197 adapted to engage a pin 198 (shown dotted) projecting laterally from a link 199 lying back of the link 76 except at the lower end where it bends out and connects at 200 with a lever 201 pivoted at 202 to the base plate 2 of the machine. The base plate at this point is provided with a recess 203 in which the lever 201 is adapted to swing. The stub shaft 67 hereinbefore referred to, passes through a depending boss 204 on the lower side of the base plate 2, this boss being bored out from the inside to receive a clutch member 205 provided with ratchet teeth adapted to coöperate with similar ratchet teeth upon the ball joint 68 connecting the stub shaft 67 with the worm shaft 69. The forward end of the lever 201 at 206 is formed as a yoke and engages an annular flange 207 upon the clutch member 205, the latter being slidably mounted upon the stub shaft 67 and held in its upper or engaging position by a coiled spring 208, substantially as indicated in Fig. 44. The cam 197 on the handle shaft 79 is so arranged that when the handle 9 is turned one turn the shaft 79 will be turned one-eighth of a turn and the cam will engage the pin 198 and shift the clutch 205 out of engagement, while the "waiting" registers are being operated upon.

The two register frames under the designation "waiting" in Fig. 1 are shown in Fig. 37 as the frames 43ª adapted to be driven by the shaft 53 and gears 51 connected therewith and operating upon racks 50, the slide frames corresponding in essential details with the frames hereinbefore described in connection with the "fare" register. The shaft 53 is mounted for longitudinal movement toward the right to disengage the units frame and engage the tens frame with the respective gears. The side wall 36, as indicated in Figs. 6 and 37, is preferably provided with an inwardly extending boss 209 which is bored out to act as a bearing for the end of the shaft 53 and permit the longitudinal movement thereof. A spring 210 surrounds the shaft and one end thereof bears against the boss 209 while the other end engages a disk 211 secured to the shaft 53 by a pin 212 through its hub.

Referring more particularly to Figs. 4, 25 and 26, it will be seen that the clock mechanism comprises a spring barrel 213 to which a spur gear 214 is secured. The gear 214 meshes with a pinion 215 secured to a shaft 216 pivoted in the partition plate 34 and the outside plate 36. The spring barrel 213 and gear 214 revolve upon a shaft 217 which it will be understood projects through the outside casing 1 and serves for winding up the spring, a suitable ratchet 218 and pawl 219 being associated therewith for holding the spring wound up. The pawl 219 is pivotally mounted upon the frame plate 36 and a spring 220 is provided to urge the pawl into engagement with the ratchet 218. (See Fig. 32.) The shaft 216 carrying the pinion 215 also carries a gear 221 secured thereto which meshes with a pinion 222 in turn connected with a gear 223 which meshes with another gear 224, the latter meshing with a pinion 225 connected with a gear 226, the latter engaging a pinion 227 connected with the escapement wheel 228, as indicated in Figs. 4 and 25 of the drawings. A bearing plate 229, secured to the inside partition plate 34 by suitable studs and screws 230, is adapted to provide the pivot bearings for the clock gear just referred to. The escapement wheel 228 is adapted to be released by an anchor escapement 231 in the usual manner by means of a balance wheel 232. I preferably provide on the handle operated shaft 233, a cam disk 234 (see Fig. 31) adapted to coöperate with a pin 235 projecting from the side of a lever 236 pivoted upon a screw 237 secured to a fixed portion of the instrument. The lever 236 is provided with a brake spring 238 preferably curved around to contact at 239 with the balance wheel 232 and prevent the latter from moving when the cam is in the position indicated in Fig. 31. In this position the register is operating on the "fare" slides through the engagement of the worm and worm gear. When the handle is turned forward one turn farther or into "waiting" position, the pin 235 will ride off of the cam 234 and be drawn into the notch therein by a suitable spring 240 thereby moving the portion 239 of the brake spring away from the balance wheel 232 so that the latter may vibrate in the usual manner to permit the clock to run. This brake mechanism is adapted to operate simultaneously with the clutch releasing mechanism previously described and shown in Fig. 44 of the drawings.

The clock mechanism is so proportioned that the spring barrel gear 214 makes one complete revolution in an hour and the gear 221 is adapted to complete one revolution every six minutes. The latter gear is turned clockwise, as viewed in Fig. 25, and has pivoted thereon a pawl 241 held in place by a spring 242 to engage a ratchet wheel 243 loosely mounted upon the shaft 216. The ratchet wheel 243 is provided with a hub extending toward the right (Fig. 4) and has secured thereto a disk cam 244 adapted to coöperate with a pin 245 projecting laterally from the side of a rock arm 246 pivoted upon the slide frame shaft 53, as indicated in Figs. 25 and 26 of the drawings. The rock arm 246 is connected with another rock arm 247 with which a spring 248 is connected, the opposite end of the spring at 249 being secured to a fixed portion of the machine. By this arrangement it will be seen that the pin 245 will follow the cam 244 which is adapted to lift the arm 246 outward and then suddenly permit it to swing inward toward the pivot of the cam. This action will occur every six minutes since the gear 221 completes one revolution in that time. The rock arms 246 and 247 are connected together by a hub 250, as will be seen in Fig. 4 of the drawings, and a depending yoke arm 251 is adapted by coöperation with an annular groove 252 to hold the rock arms 246—247 in proper position upon the supporting shaft 53. The yoke or fork 251 is preferably secured by means of a screw 253 to a rod 254 extending between the partition plates 34 and 36. The rock arm 247 preferably has, pivoted on the side thereof, a pawl 255 (see Fig. 28) held by a spring 256 to engage a ratchet wheel 257, loosely mounted upon the shaft 53 and provided with a slotted hub at 258 adapted to engage a pin 259 extending transversely through the shaft 53, as indicated in Fig. 4 of the drawings. The slotted connection of the hub 258 permits longitudinal movement of the shaft 53 with respect to the ratchet 257 as required for carrying the tens. A pawl 260 is preferably pivotally mounted upon the rod 254 and extends downward to engage the ratchet 257 and prevent retrograde movement thereof, a spring 261 being provided to actuate the pawl 260 in the usual manner. From the construction described, it will be understood that every six minutes the rock arm 246 will be carried outward upon the cam 244 and permitted to drop back toward the center and each time it so drops under the impulse of the spring 248, the pawl 255 by engagement with the teeth of the ratchet 257 will turn the slide frame shaft 53 one step or one-tenth of a revolution. Since the shaft 53 is connected with the units slide frame 43ª, the latter will be advanced step by step every six minutes to register "waiting" time.

When the units "waiting" register frame 43ª has been advanced nine steps it is necessary at the next step to actuate the tens register frame and restore the units register frame to initial zero position. The transfer of the tens is accomplished by the clock mechanism in a manner similar to that described for the "fare" registers. The shaft 53, as will be seen in Figs. 4 and 37, is normally held toward the left by the spring 210 and the disk 211 is adapted to be engaged by the roller or knob 262 on the end of a rock arm 263 secured to a rock shaft 264 pivoted between the base plate 2 and the top plate 38, as will be seen in Fig. 25 of the drawings. The rock shaft 264 is provided with an additional rock arm 265 provided with a roller 266 adapted to coöperate with a wedge cam 267 on a disk 268 mounted upon the spring barrel shaft 217 and connected by ratchet and pawl with the barrel gear 214 and, therefore, adapted to make one complete revolution every hour. The connection between the gear 214 and the disk 268 is preferably made by means of a pawl 269 held by a spring 270 in engagement with a ratchet 271 secured to the disk 268 substantially as indicated in Figs. 4 and 25 of the drawings. Thus, whenever the spring barrel gear 214 under the impulse of the main spring of the clock completes one revolution, the wedge cam 267 will during the last six minutes of the hour pass under the roller 266 and rock the rock shaft 264 together with the rock arm 263 outward and shift the shaft 53 toward the right by contact with the roller 262 on the end of the arm 263 with the disk 211, thus disengaging the "waiting" register units gear 51 from its corresponding rack 50 and engaging the corresponding tens gear and rack. This shifting of the shaft 53 takes place before the tenth jump of the rock lever 246 and hence when the cam 244 passes out from under the pin 245 to permit the tenth jump, the tens frame will be actuated one step. During the next six minutes or before the next step by step jump of the rock lever 246, the wedge cam 267 will have passed out from under the roller at the end of the arm 265 and the spring 210 will restore the shaft 53 to normal position with the units register frame in mesh with its gear 51.

*Hour rate.*—It is sometimes required to register the charges at an hour rate and I provide means for utilizing the clock mechanism for this purpose. I have provided but one slide frame for hour rate, located at the middle of the series under the designation "hour rate" as seen in Fig. 1 of the drawings. The rate here given is $2.50 per hour, but obviously any rate may be used. The actuation of this slide frame is different from that hereinbefore described as "fare" and "waiting" slide frames and is more particularly shown in Fig. 27 of the drawings. It will be seen that the slide frame 43$^b$ is substantially similar to the other slide frames and reciprocates upon the rods 39 and 40 in a similar manner. A pawl 55$^b$ similar to the pawl 55 is pivotally mounted upon the shaft 53 and provided with a corresponding spring 64 to keep the nose thereof in engagement with a ratchet rack 54 corresponding with the similar rack on the units frame 43 of the fare register, as shown in Fig. 27. Instead of the rack 50, however, I provide an additional ratchet feed rack 272 secured to the slide frame. A pawl or dog 273 is adapted to coöperate with the ratchet feed rack 272 to advance the slide frame 43$^b$ one step every hour. The pawl or dog 273 is preferably provided with a rearwardly projecting offset portion 274 adapted to slide in a slot in a bracket 275 secured at 276 to the central partition strip 42, as will be seen in Fig. 27. The object of this is to insure the parallel reciprocation of the pawl or dog 273. A spring 277 is connected with the pawl and with a rock arm 278 to which the pawl is pivoted at 279; the spring being adapted to hold the pawl in engagement with the feed rack 272. The rock arm 278 to which the pawl 273 is pivoted (see Fig. 42) is secured to a rock shaft 280 located near the front of the machine, as will be seen in Fig. 4. The rock shaft 280 passes through the partition plate 34 and is provided with a torsion spring 281, one end of which rests under the rock arm 278 and the other end takes into a hole at 282 in the partition plate 34, the tendency of the spring being to elevate the pawl end of the rock arm. The shaft 280, near the right end thereof, is provided with another rock arm 283 (see Figs. 25, 26 and 42) the free end of which is adapted to coöperate with a cam disk 284 connected with the ratchet wheel 271, which as previously described, is driven by the main spring gear 214 and rotated once every hour. The cam 284 is located to the right of the disk 268, as seen in Fig. 4 of the drawings. Thus, it will be seen that the pawl 283 is adapted to follow the cam 284 and will be rocked outward and allowed to drop off the tail of the cam once every hour and thus advance the "hour rate" register slide frame 43$^b$ one step to indicate an additional charge at the hour rate.

Obviously, it is not intended that the clock shall record upon the "waiting" register frames and upon the "hour-rate" register frame at the same time. Hence, I provide means for switching from one to the other, which means insures that only one set of register frames will be actuated by the clock at a time. This comprises a thimble cap 285 placed over the end of the shaft 280 and extending through the end plate 36, as will be seen more particularly in Fig. 42 of the drawing. This thimble cap acts as a bearing for the end of the shaft 280 and carries an arm 286 secured thereto and projecting inward, provided with a lug 287 adapted to project laterally over a rock arm 288 secured to the hub 289 of the cam follower rock arm 283 secured to the rock shaft 280, as previously described. The end of the thimble 285 at 290 is slotted vertically and the stub shaft 16 has a squared or flattened end adapted to be projected into the slot 290 so that when the arm 17, hereinbefore described as connected with the shaft 16, is moved, the rock arm 286 will be moved in one direction or another. In the position the parts are shown in Figs. 25 and 26, the pin 19 is in the lower hole 21 or in the position shown in Fig. 3 of the drawings, so that the overlapping lug 287 holds the pawl 283 out of the field of the cam 284 so that the rock shaft 280 cannot be reciprocated to actuate the "hour-rate" register frame 43ᵇ. A link 291 is pivotally connected at 292 to the rock arm 286 extending from the thimble 285, the upper end of the link 291 being slotted at 293. The slot 293 extends beyond a pin or stud 294 extending laterally from the rock arm 246, as will be seen in Figs. 25 and 26, the slot being concentric with the shaft 53 about which the rock arms 246 and 247 rock. In the position shown in Figs. 25 and 26, it will be seen that the rock arm 246 can be rocked by its associated cam 244 to impart the step by step movement to the "waiting" register frames. If, however, the arm 17 (Figs. 3 and 42) is shifted from the position indicated in Fig. 3, so that the pin 19 enters the upper hole 21 then the link 291 by engagement with the pin 294 will swing the arm 246 out of the field of the cam 244 and thus effectually prevent step by step advancing of the "waiting" register frames. The same movement of the rock arm 286 simultaneously releases the pawl 283 so that the latter may move inward into contact with the cam 284 and thus place into active operation the "hour-rate" mechanism.

*Hour-rate signal.*—I have previously referred to the signal window 4 (see Fig. 1) through which certain signals are to be displayed in a manner hereinafter to be described, but in this connection I shall point out how a signal is set for indicating that the instrument is on "hour-rate." This is best shown in Figs. 24 and 25 and comprises an angularly bent link 295 pivoted on the pivot screw 292 hereinbefore referred to as connecting the link 291 with the thimble rock arm 286 (see Fig. 42). The upper end of the link 295 is pivotally connected at 296 to an arm 297 pivoted at 298 to a lug 299 projecting from the partition plate 34, as indicated in Fig. 24. The outer end of the arm 297 carries a semaphore 300 bearing the words "Hour rate." Normally, this lies in the position indicated in Fig. 24, out of the field of the window 4 in the outer casing, but when the arm 17 is shifted so that the pin enters the upper hole 21 to cut out the "waiting" registers and throw in the "hour-rate" register, the semaphore 300 will be thrown to a position over the circle "Vacant" in Fig. 24, and display through the window 4 the words "Hour rate."

*Resetting "waiting" and "hour rate" parts.*—When the trip is completed and the passenger requests the amount of the charges they can be read off the front side of the register frames through the sight window 5, but preferably I print the charges on a record strip and on a card to be delivered to the passenger. When this is done it is necessary to return the "waiting" and "hour rate" register slides to zero position and also to return the cams 244 and 284 to initial position in order that the next registration may be correctly started. For this purpose I mounted upon the shaft 216 a sliding collar or hub 301 provided with a laterally extending pin 302 adapted when the collar is slid toward the left to engage a similar pin 303 projecting in the opposite direction from a flange 304 formed as a part of the hub to which the cam 244 and ratchet wheel 243 are secured. A spring 305 normally thrusts the collar 301 toward the left and holds it in the position indicated in Fig. 4 of the drawings. A spur gear 306 is secured to the collar 301 and engages a similar spur gear 307 secured to a hub or slidable collar 308 mounted upon the spring barrel shaft 217. The hub or sliding collar 308 is likewise provided with a laterally projecting pin 309 adapted when the collar is slid to the left to engage with a similar pin 310 secured to the disk 268 which, as seen in Fig. 25, carries the wedge cam 267 and to which the cam 284 is also secured (Fig. 4). A spring 311 normally keeps the pins 309 and 310 out of engagement. The upper hub or slidable collar 301 is provided with a circumferential groove in which a pinion 312 is formed whereby the collar may be rotated upon the shaft 216. In order that the two collars 301 and 308 may be slid simultaneously, a disk 313 is secured to the upper spur gear 306 and overlaps the lower spur gear 307 so that when the upper collar 301 is slid toward the left the lower one will likewise be slid toward the left so that the respective pins may be brought into engagement. A vertically slidable rack 314 is adapted to engage the pinion 312 and rotate the same when the rack is reciprocated, for instance, see Fig. 49. The rack 314, like the rack 157, is formed on the edge of a plate 315 having a tubular edge 316 surrounding a vertically disposed rod 317 mounted between the base plate 2 and the top plate 38, as will be seen in Fig. 49. A pin 318 projects laterally from the tubular portion 316 and a spring 319 is connected therewith and to a hook 320 secured in the top plate 38, the spring being adapted to restore the rack to normal position after it has been moved down the rod 317 to rotate the hubs or collars 301 and 308. The plate 315 is adapted to be rocked upon the rod 317 so as to move the collars 301 and 308 toward the left and bring the respective pins into engagement or in the path to engage the corresponding pins connected with the cams so that when the rack 314 is moved downward the collars 301 and 308 will rotate in opposite directions and the pins associated therewith will pick up the cam pins and rotate the cams forward to the zero position, the ratchet and pawl connections of the respective cams being adapted to permit this independent movement. The rack 314 is rocked and slid downward by suitable handle connections to be more fully described hereinafter.

"*Extra*" *register.*—The next and last of the series of register slides to be described is the one at the extreme right under the caption of "Extra" in Fig. 1 of the drawings. This slide frame 43ᶜ is constructed substantially similar to the "hour rate" slide 43ᵇ and is provided with a retaining pawl similar to the pawl 55ᵇ and a corresponding ratchet rack 54. It is also, as will be seen by comparing Figs. 27 and 36, that a feed rack similar to the rack 272 is provided at 321 and secured to the "extra" frame 43ᶜ as will be seen in Fig. 36. A pawl or dog 322 is adapted to engage with the feed rack 321 and is pivotally connected at 323 with the inner end of a push rod 324 projecting through a boss 325 below the base plate 2. A spring 326 is connected with the pawl 322 at 327, the opposite end of the spring being connected to a hook 328 extending inward from the base plate 2. The spring is adapted to hold the nose of the dog in engagement with the feed rack 321 and also keep the push button 329 in its outermost position. Preferably, an annular flange 330 is provided on the inner end of the push rod 324 to limit the outward movement thereof. Like the similar pawl in Fig. 27, the pawl or dog 322 is preferably provided with a lug extension 331 sliding in a slotted bracket plate 332 which serves as a guide for retaining the pawl in the field of the feed rack 321. The slide frame 43ᶜ like the other frames, is provided with indicating characters on one face and corresponding type on the inner face, the characters preferably representing extra charges at five-cents for each step of advancement of the slide frame. By this construction it will be understood that the "extra" slide frame will be operated only by manual means—namely, the push button 329 when it is desired to register extra charges.

*Printing mechanism.*—I shall next describe the printing mechanism whereby the record is taken of the charges indicated upon the several register frames. The printing mechanism, as previously indicated, is mounted in the rear compartment inclosed by the rectangular partition 33, as will be seen in Figs. 6, 23 and 33 of the drawings. A rock frame 333, the side arms of which, as will be seen in Fig. 23, are irregularly curved to avoid certain fixed parts of the mechanism and permit the frame to rock is mounted upon pivot screws 334 located near the bottom of the casing, as will be seen in Figs. 23 and 33. Each arm of the rock frame 333 is provided with a rearwardly projecting lug or arm 335 to which a spring 336 is secured, the other end of the spring at 337 being secured to a pin projecting inward from the partition plate 33. The spring is adapted to hold the rock frame 333 in its rearmost position against stop lugs 338 also secured in the frame plate 33. This normal retracted position of the rock frame is indicated in Fig. 23. The rock frame 333 is provided with a revoluble platen 339 mounted therein substantially opposite the top row of types in the series of register frames or opposite the printing line. This platen is preferably provided with a plurality of knobs or lugs 340 adapted to enter a series of holes 341 in the card strip 342 upon which the record is printed for delivery to the customer, the form of this card being shown in Fig. 34 of the drawings. The platen 339 is preferably mounted upon a shaft 343 and may be removably inserted into the frame in any suitable manner, as by a spring spider 344, represented in Fig. 33 of the drawings. The platen rock frame 333, just above the platen 339, is provided with a guide slot formed by transverse plates 345 and 346 through which the strip of paper 342 is adapted to be led. The lower plate 345 at 347 is provided with a slot extending transversely thereof and standing opposite a knife blade 348 slidably mounted upon an angled portion 349 of the plate 346, as will be seen in Figs. 23 and 33 of the drawings. Suitable screws 350 retain the knife in position, the screws passing through corresponding slots in the knife, as will be seen in Fig. 33. The knife is preferably provided with pins 351 projecting inward through the angle bracket 349 against which a spring 352 is adapted to thrust, as will be seen in Fig. 6 of the drawings, the object of the spring being to keep the knife in its uppermost position and restore it to that position after it has been used to sever the card or ticket 32 from the strip 342. The card strip 342 is preferably taken from a roll 353 removably mounted upon a shaft 354 in any suitable or preferred manner. Preferably, one end of the shaft is mounted in a notch at 355 in the side strips of the rock frame 333 and held in position by a spider friction spring 356, as will be seen in Fig. 33.

It is desirable to simultaneously print a record of the charges on a strip to be retained in the instrument for the use of the proprietor and for this purpose a record strip 357 is taken from a roll 358 preferably mounted upon a shaft 359 removably secured in place between the side strips of the platen rock frame 333 by a spring spider 360, as will be seen in Fig. 33 of the drawings. This record strip 357 passes from the roll 358 upward over the platen 339 and over a second sprocket roll 361 provided with lugs or knobs 362, similar to those of the platen, but slightly farther apart to coöperate with perforations 363 in the edge of the record strip 357, such as represented in Fig. 35 of the drawings. The record strip 357 is adapted to be advanced only line by line and is preferably fed into a hollow cylinder receiving case 364 provided with a longitudinal slot at 365 through which the strip of paper enters the cylinder. The record strip is adapted to coil itself in the cylinder and since the length of the strip fed therein for a day's service of the taxicab would be comparatively small, the capacity of the cylinder represented should be sufficient. The cylinder 364 is preferably mounted upon slide lug strips 366 adapted to enter slideways 367 preferably secured to the platen rock frame 333, as indicated in Figs. 23 and 33 of the drawings. A spring clip 368 is preferably provided for retaining the receiving cylinder 364 in position.

The inner surface of the record strip 357 is preferably carbonized so that when the platen 339 is thrust against the type of the register slides to print the record, a carbon copy of the record will be printed upon the ticket strip 342, an original or ribbon printed record being made upon the face of the record strip 357. For this purpose a ribbon 369 passes upward between the record strip 357 and the type on the register frames. The ribbon is preferably the full width of the series of register frames and is fed transversely to the printed line by a suitable mechanism. The lower ribbon spool 370 is pivotally mounted in the side walls of the partition 33 upon a shaft 371, the spool being preferably held in place by a friction spider spring 372 as will be seen in Fig. 33 of the drawings. The upper ribbon spool 373 is similarly mounted in the side walls of the partition 33 by a shaft 374 and a spring spider 375. A rock shaft 376, hereinafter referred to, extends transversely of the ribbon just above the sprocket roller 361 and over which the ribbon is carried, is adapted to keep the ribbon from rubbing against the strip of paper. The rock shaft 376 is mounted in the side walls of the partition 33. The platen rock frame 333 also carries a transverse alining strip 377 tapered slightly and adapted to enter the types 48 on the series of register frames and aline the same while the platen is being pressed thereagainst to make a record of the charges.

*Ribbon feed.*—The shafts 378 and 379 which are connected respectively with the spiders 372 and 375, project through the side wall of the partition 33 and as will be seen in Figs. 17, 19 and 33, are provided with ratchet wheels 380 and 381 whereby the respective ribbon spools may be turned to feed the ribbon in one direction or the other. I preferably mount on the side of the partition plate 33 a vertical slide plate 382 (see Fig. 19) held in place thereon by screws 383 passing through slots 384 and 385 thereby permitting reciprocal movement of the slide plate or strip 382. On the upper end of the slide plate I preferably mount at 386 a pawl or dog 387 adapted to coöperate with the ratchet wheel 381 secured to the shaft 379 of the upper ribbon spool. A spring 388 operates against a tail 389 connected with the pawl, as will be seen from the drawing of Fig. 19. On the same slide plate 382, at the lower end thereof, another dog 390 is pivoted at 391 in position to coöperate with the lower ratchet wheel 380 secured to the shaft 378, to rotate the lower ribbon spool, a spring 392 being provided to throw the dog into engagement with the ratchet wheel, the spring acting against a tail 393, as indicated in Fig. 19. Obviously, only one of the pawls 387 or 390 is intended to be in active operation at a time in order that the ribbon may be fed in one direction or the other.

It is also desirable that the feed of the ribbon may be reversed when one spool becomes empty. The ribbon reverse is here represented by a slide strip 394 slidably mounted upon the slide plate 382 by screws 395 passing through elongated slots 396 in the strip 394, as indicated in Figs. 19 and 22 of the drawings. The strip 394 is provided with oppositely extending arms 397 and 398 adapted to coöperate respectively with the tails of the pawls 387 and 390. The arms 397 and 398 are so spaced relative to the tails 389 and 393 of the respective pawls that in the extreme movement of the slide 394 one or the other of the pawls 387 and 390 will be held out of engagement with its respective ratchet wheel and, therefore, permit the ribbon to be fed in but one direction. A knob 399 (see Fig. 22) is secured to the slide strip 394 and passes through a slot 400 in the strip 382 and through a slot 401 in the partition plate 33 so that the proprietor may shift the position of the strip 394 in order to reverse the direction of the feed of the ribbon. Preferably, a leaf spring 402 is secured to the strip 384 and is provided with a ball end at 403 adapted to coöperate with holes 404 in the slide plate 382 for the purpose of holding the ribbon reversing strip 394 in either of its extreme positions. The slide plate 382 is preferably provided with an ear at 405 to which a spring 406 is connected, the opposite end of the spring at 407 being secured to a pin projecting from the wall of the partition 33, the spring being adapted to retain the strip in or return it to its normal position, as indicated in Fig. 19 of the drawings. The strip 382 for feeding the ribbon is adapted to be reciprocated when the handle is operated to print the record and restore the parts to initial position.

*Handle mechanism.*—I shall now describe the parts operated by the handle and show the connection or relation thereof with the various mechanisms hereinbefore described. The handle shaft 7 which, as previously described, is connected with the handle knob 9, has secured thereto two pinions 408 and 409 one at each end thereof, as will be seen in Fig. 29 of the drawings. The pinions are the same size and each adapted to mesh with two spur gears the proportions being as eight to one—that is, it will require eight rotations of the handle shaft 7 to rotate the respective gears once. The pinion 408 on the left end of the shaft 7 meshes with the two spur gears 410 and 411. The spur gear 410 is preferably secured to the shaft 79 by a pin 412 through its hub so that the shaft 79 will be given one complete turn for eight turns of the handle shaft 7. The spur gear 410 is preferably provided with a wedge cam 413 adapted to coöperate with the upper free edge of the rack plate 155—157 pivoted on the rod 159, as seen in Figs. 29 and 48 of the drawings. The wedge cam 413 is so located as to operate the rack strip 155 at the proper time to shift the resetting clutch pins 140—144—151 actuated by the rack 157, as hereinbefore described. The upper end of the tubular portion 158 of the slide plate 155 is provided with a pin 414 projecting laterally therefrom and entering the slotted end 415 of a rock arm 416 pivoted upon the shaft 7 and secured to the hub 417 of another rock arm 418 carrying a pin 419 adapted to coöperate with a cam arm 420 secured to the shaft 79, as indicated in Figs. 29 and 48. The cam arm 420 at the proper time in the rotation of the shaft 79, picks up the pin 419 and thrusts the rock arm 418 outward and the outer end 415 of the rock arm 416 downward so as to move the rack plate 155 downward and restore the parts operated upon by the pins to normal position ready for the next setting of the instrument. The rock arm 418 is preferably provided with an oppositely extending arm 421 to which a spring 422 is secured, the opposite end of the spring being secured to a pin 423 projecting from a fixed portion of the instrument, the spring being adapted to assist in restoring the cam arm 418 to initial position. The shaft 79 also has mounted thereon the cams 80 and 197, shown in Figs. 44 and 47 and hereinbefore described as adapted to actuate the links connected respectively with the rock frame carrying the worm and the fork 201 for throwing out the clutch 205. The shaft 79 also carries the cam arm 163 represented separately in Fig. 43, which as previously explained, is adapted to rock the arm 177 and lift the units register frame of the "fare" registers at the time the worm 70 is thrown into mesh with the worm gear, as previously explained. Suitable springs 82 and 199$^a$ are provided to restore and hold the respective slides 76 and 199 in their normal uppermost position.

The oppositely disposed spur gear 411 associated with and simultaneously turned by the pinion 408, is secured to a shaft 424 pivotally mounted between the outside frame plate 37 and a depending hanger 424$^a$ projecting from the underside of the top plate 38, as will be seen in Fig. 29. This shaft 424 preferably extends through the end plate 37 and has secured thereto on the outside of said plate a mutilated ratchet wheel 425 represented separately in Fig. 20 of the drawings. This ratchet wheel is adapted to coöperate with a pawl or dog 426 pivoted at 427 to the side plate 37, a spring 428 being adapted to hold the dog or pawl in engagement with the ratchet wheel. This device constitutes a full-stroke mechanism which requires that after more than two turns of the handle shaft 7, the shaft cannot be returned to initial position until the full eight turns have been completed. The ratchet wheel 425, as shown in Fig. 20, is in its normal position where it will be seen that it is provided with a blank space at 429 adapted to permit two complete rotations of the handle shaft 7 in a forward direction and permit the handle to be turned in the opposite direction back to initial position. But if the operator goes beyond the two complete rotations of the handle shaft 7 then the entire eight rotations must be completed.

The object of permitting the reverse rotation of the handle after the second forward rotation thereof, is to enable the mechanism to be changed from one form of registration to another. For instance, during the first rotation of the handle, the cam 80 (Fig. 44) throws in the worm screw 70 and the cam arm 163 lifts the units register frame 43 of the "fare" register the preliminary amount to represent the minimum charge, and the instrument is adapted to be driven by the vehicle to register upon the "fare" register slides. When it is desired to go into "waiting", the handle is given another turn forward and the cam 197 will be caused to actuate the link 199 and separate the ratchet clutch 205 so that the vehicle will not turn the worm even though it might be operated while "waiting." Simultaneously the clock will be started by the actuation of the cam 234 (see Fig. 31) so that the instrument will record on the "waiting" register frames. When the waiting period is over it is necessary to again throw in the "fare" registers and the handle shaft is rotated one turn in the reverse direction, the ratchet 425 permitting this because of the presence of the blank space 429. This reverse operation immediately restores the connection of the clutch 205, and stops the clock and the vehicle will continue to actuate the "fare" register.

The shaft 424 at its inner end is provided with a disk 430 which has a pin 431 projecting inward therefrom (Fig. 29) adapted to coöperate with the end of an angle plate 432 secured to the upper end of the platen rock frame 333, as will be seen in Figs. 6, 23 and 29. The angle plate 432 extends through slots 433 in the side walls of the compartment partition 33 into the field of the pin 431. When the handle shaft 7 has been rotated twice the pin 431 is brought into proximity to the end of the angle plate 432 so that during the third rotation of the handle shaft 7 the pin 431 will engage the angle plate and swing the platen frame on its pivots 334 and force the platen against the types to take a record of the amount of the charges represented thereby. A similar disk and pin coöperating with the same angle plate 432 is located on the opposite side of the machine and will be again referred to when these parts are described. The disk 430 also carries another pin 434 projecting on the opposite side from the pin 431 adapted after the printing has been accomplished to engage an arm 435 extending upward from a rock lever 436 secured to the end of the rock shaft 376 hereinbefore referred to as passing through the printing compartment and finding bearing support in the side walls 33 of the compartment (see Figs. 17 and 23). The rock arm 436 extends toward the rear over the projecting end 437 of the knife 348 so that actuation of the rock arm will push down the knife to cut off the ticket 342, hereinbefore referred to. The rock arm 436 (see Fig. 19) carries a laterally projecting pin 438 adapted to enter a slot in the slide plate 382, which, as previously described, is adapted to be reciprocated to feed the ribbon. A certain amount of lost motion is left between the end of the lever arm 436 and the end 437 of the knife in order that sufficient motion may be given to the ribbon slide plate 382 to feed the ribbon the required amount. Another rock arm (Fig. 33) at the other end of the rock shaft 376 engages the other end of the knife 348.

It will be remembered that the units gear 51 on the shaft 52 is normally in mesh with the units slide frame of the "fare" register, hence, in resetting the mechanism to zero, it is necessary that the gear 51 (Fig. 6) be disengaged from the corresponding rack 50 in order that the units frame may drop to its initial or zero position. This is accomplished by rocking the rock shaft 129 (Figs. 17 and 29) through a rock arm 439, the roller 440 of which is adapted to coöperate with a wedge cam 441 secured to the face of the gear 411, as indicated in Fig. 29. This wedge cam 441 is preferably located in the last eighth of the revolution of the gear 411 and is preferably arranged to continue to hold the gear 51 out of mesh with the rack of its corresponding unit slide frame of the "fare" register until the first operation or turn of the handle, hereinbefore described as necessary to throw in the worm and start the "fare" register. It has also been pointed out that during this first turn of the handle the units slide of the fare register is moved by the mechanism, illustrated in Fig. 43, to lift the frame an amount corresponding with the minimum charge. Obviously, while the units slide frame is being lifted in this manner, the corresponding gear 51 and rack 50 must be disconnected and the wedge cam 441 is adapted to keep the gear and rack disconnected until the completion of the lifting movement by the rock arm 177, after which the roller 440 will pass off of the wedge and permit reëngagement of the gear 51 and rack 50 so that registration may proceed in the manner described.

The pinion 409 on the opposite end of the handle shaft 7 meshes with the two spur gears 442 and 443 which are identical with the spur gears 410 and 411 previously referred to and make one turn for eight turns of the handle shaft. The gear 442 is preferably secured to a shaft 444 pivotally mounted between the outside frame plate 36 and the partition plate 34, as will be seen in Fig. 29. The gear 442, like the gear 410, carries a wedge cam 445 adapted to coöperate with the rack plate 315 pivoted on the rod 317, as shown in Fig. 49 of the drawings. The rack plate 315 is provided with an upwardly and forwardly projecting extension 446 provided at 447 with a rib adapted to coöperate with the wedge cam 445 so that the latter will rock the rack plate to shift the collars 301 and 308 to the left, as seen in Fig. 4, preliminary to rotating the collars to restore the respective cams 244 and 284 to initial zero position. The collars are rotated as previously described, by moving the rack plate 315 downward and this is accomplished through the rotation of the handle by means of an arm 448 pivoted on the handle shaft 7 and carrying at its outer end a pin 449 adapted to contact with the upper end of the rack plate extension 446, as indicated in Figs. 25, 29 and 49. The arm 448 is preferably connected with another arm 450 bell-crankwise, the arm 450 carrying a pin 451 (Fig. 49) adapted to coöperate with a cam arm 452 secured to the shaft 444 and adapted to rotate therewith counterclockwise, as seen in Fig. 49. By this arrangement it will be seen that when the shaft 444 is rotated a predetermined amount, the cam arm 452 picks up the pin 451 and rocks the arm 448 causing the pin 449 therein to move the rack plate 315 downward upon the shaft 317 to reset the associated cams to zero position. This movement of the rock arm 448 is timed to occur while the rib 447 is riding on the wedge member 445.

The shaft 444 is also preferably provided with a beveled gear 453 secured thereto and adapted to mesh with a beveled pinion 454 secured to a short shaft 455 rotatably supported in a bearing bracket 456 secured to the partition wall 34, as will be seen in Figs. 24 and 29. The forward end of the shaft 455 has mounted thereon, a semaphore disk 457 provided with designations in three of its quadrants, as indicated in Fig. 24. The proportions between the beveled gear 453 and pinion 454 are such as to turn the disk one quarter of a turn for each one-eighth of a turn of the shaft 444. Normally, the designation "vacant," in the circle 458 stands opposite the window 4 (Fig. 1), but when the handle shaft 7 is turned once to throw in the "fare" register mechanism, the disk is turned to the second quadrant and the circle 459 containing the word "fare" is opposite the window 4. As previously described, the second turn of the handle disconnects the "fare" register and throws in the "waiting" register and the disk 457 will be turned to the second quadrant to bring the circle 460 opposite the window 4 and present the word "Waiting."

The shaft 444 also carries the cam disk 234 (Fig. 31), which, as previously described, is adapted at the second turn of the handle shaft 7 to permit the pin 235 to drop into the notch in the cam 234 so that the spring 240 will move the brake loop 238 away from the balance wheel 232 and permit the clock to start, thus throwing in the "waiting" register mechanism, at which time the disk 457, just previously described, is in position to display the word "waiting" through the window 4.

The gear 443 operated by the pinion 409 is secured to a short shaft 461 pivoted between the side plate 36 and the partition plate 33, as indicated in Fig. 29. The gear 443 carries a wedge cam 462, somewhat similar to the wedge cam 441 on the gear 411, adapted to coöperate with a roller 463 on the end of the rock arm 464 secured to the rock shaft 264 (Fig. 25) which, as previously explained, is adapted to shift the "waiting" register shaft 53 to the right to disconnect the units "waiting" register frame from the corresponding gear 51. The object of the wedge 462 is to disconnect the frame and gear during the resetting operation in order that the frame may drop to zero position. When the roller 463 passes off of the wedge 462 the units gear 51 on the shaft 53 will again engage the units frame.

The shaft 461 at its inner end carries a disk 465 corresponding to the disk 430 and provided with a pin 466 located in the same relative position as the pin 431 and adapted to engage the adjacent end of the angle strip 432 connected with the upper end of the platen rock frame to rock the platen in the manner described.

The shaft 461 has secured thereto a cam disk 467 (Figs. 29, 45 and 46), adapted to coöperate with a pin 468 mounted in the upper end of a slidable link 469, the lower end of which at 470 is connected with a rock arm 471 secured to the end of a rock shaft 472 which has bearings in the partition plates 34 and 35 and extends transversely through the several register frames, as will be seen in Figs. 23 and 27. The rock shaft 472 is provided with lugs or fingers 473 adapted to engage lugs 474 formed as part of each of the pawls 55, 56, 57, 61, 62 and 55ᵇ, the object of this mechanism being to lift the pawls out of engagement with the corresponding racks and hold them out of engagement while the slide frames 43, 43ᵃ, 43ᵇ and 43ᶜ are returned to zero position. The rock shaft 472, opposite the "hour rate" and "extra" slide frames has depending fingers 472ᵃ adapted to coöperate with pins 472ᵇ in the upper ends of the respective pawls 273 and 322 (Figs. 27 and 36) to lift the latter when the pawls 55ᵇ are lifted. A spring 469ᵃ holds the link 469 in normal position.

The shaft 461 also carries a rock arm 475 adapted at a certain stage of the rotation of the shaft 461 (see Fig. 25), to engage a cam pin 476 on the end of an arm 477 forming part of a bell crank lever pivoted upon the handle shaft 7, as indicated in Figs. 25 and 29. The arm 477 is connected with another arm 478 extending rearward and pivotally connected at 479 with the link end 480 of a rack 481 extending down the side of the partition plate 33 of the instrument, as indicated in Fig. 25. The rack 481 is adapted to mesh with a pinion 482 secured to a ratchet wheel 483 which, coöperating with a pawl 484, is adapted to rotate the platen shaft 343 and turn the ticket strip 342 out through the slot 31 where the same will be cut off by the knife 348, which, as previously described, will be depressed by the rock arm 436 (Fig. 17). The opposite end of the rock shaft 376, carrying the arm 436 to actuate the knife, carries a corresponding arm 485 (Fig. 25) adapted to coöperate with the opposite end of the knife 348. The slide rack or link 480 is offset at 486 to form a shoulder adapted to engage the end of a rock lever 487 pivoted on the end of a shaft 488 carrying a ratchet wheel 489 secured thereto which, when actuated by the offset 486 of the rack link 480, is adapted to rotate the feed roller 361 and advance the record strip 369 one line space. A pawl 490 is pivotally mounted upon the opposite end of the lever 487 at 491 and adapted to coöperate with the ratchet wheel 489 to turn the latter one line space when the arm 478 and rack link 480 are actuated by the handle. A suitable spring 492 is connected with an upwardly extending arm 493 formed as part of the arm 478 to restore the arm and rack 481 to normal position. The opposite end of the spring 492 is secured to a fixed portion of the machine in a suitable manner not shown. It will be understood that upon the return movement of the link-rack 480—481 the ratchet and pawl (483—484) connection will prevent reverse rotation of the platen.

The bell crank lever 449, previously described, as being actuated by the cam arm 452, is normally held in its upper position by a spring 494, one end of which is connected to the pin 495, the other end being secured to a pin or stud 496 (see Fig. 25) depending from the underside of the top plate 38.

The handle shaft 7 near the frame plate 37 has mounted thereon a disk 497 provided with a single notch adapted to coöperate with the V-nose of a dog or pawl 498 pivoted on the shaft 424 as will be more particularly seen in Fig. 21 of the drawings. The pawl 498 is provided with an oppositely extending arm 499 to which a spring 500 is secured, the opposite end of the spring being secured to a fixed portion of the frame. The object of this single notch disk and pawl is to provide a click as a means for assisting the operator to count the number of turns given to the handle.

*Operation*—The operation of the instrument will be understood from the foregoing description, but I shall briefly review the several steps in the operation, particularly with reference to the part the handle plays therein. The instrument being clear and in normal position the word "Vacant" will be displayed through the window 4, as seen in Fig. 1 of the drawings. If then the vehicle is engaged for "fare" rate charges, then the operator turns the handle 9 one turn which, as previously explained, will actuate the link 169 (Fig. 43) and the link 76 (Fig. 44) to lift the units fare register frame a number of steps equivalent to the minimum charge and throw in the worm 70, respectively. The wedge cam 441 (Fig. 29) on the gear 411 will have moved one-eighth of a turn of the gear and permit the rock shaft 129 to rock and throw the gear 51 on the shaft 52 into mesh with the corresponding rack 50 of the units "fare" slide frame 43. The signal disk 457 will be turned one fourth of a turn and display "fare" at the window 4.

While the vehicle is being run with the parts in the position just described, the instrument will be driven by the vehicle through the flexible shaft 66, the worm gear will be turned idly substantially one complete turn when it will pick up the intermediate mechanism and thereafter operate to intermittently advance the slide frame 43 step by step. When carrying or transfer of the tens is to take place, the shaft 52 will be shifted to the left by the cam 104 (see Figs. 11 and 17) one space to engage the corresponding tens gear 51 with the tens slide frame. While this engagement of the tens slide frame 43 is on, the slide frame will be advanced one step during which operation the detent pawls 56 and 55 will be lifted, the latter releasing the units slide frame and permitting it to drop to zero position after which the shaft 52 is released from the cam 104 and the units gear 51 permitted to reengage the units frame and the operation of step by step advancement of the units frame is repeated. When carrying of the tens is to be done upon the hundreds slide frame, the cam 134 (Fig. 17) is brought into operation to shift the shaft 52 two spaces to engage the hundreds gear 51 with the corresponding hundreds slide frame. The hundreds slide frame is then advanced one step and through the lifting of the pawls 56 and 55 by the pawl 57 the tens and units slide frames are permitted to return to zero.

If now the vehicle is stopped while still hired by the party and is required to wait for a considerable period, the operator turns the handle shaft 7 one more turn. This additional turn of the handle by the cam 234 (Fig. 31) releases the clock and through the link connection 199 (Fig. 44) throws out the ratchet clutch 205 so that the worm 70 while still in engagement with the gear 83 will not be turned if the vehicle is run. When the handle is turned to this position the word "waiting" will be displayed at the window 4. When the passenger returns the operator merely turns the handle back one turn and the mechanism will be restored to the previous condition for "fare" registration.

When the vehicle is hired at the hour rate, the knob 19 on the crank handle 17 is moved from the position indicated in Figs. 3 and 4 so that the pin 19 will occupy the other or upper hole 21, which will switch the mechanism actuated by the clock to bring into action the hour cam 294 and throw out the cam 244 (Figs. 26 and 42) which is used when the "waiting" registers are in action. The cam 284, as previously explained, will actuate the "hour rate" slide 43$^b$ step by step advancing the slide one step every hour. During the operation of the instrument to record hour rates, it will be understood that the handle shaft 7 has been given two turns in order that the brake mechanism (Fig. 31) of the clock shall stand in released position.

Extra charges—such as additional passengers or baggage may be accumulated upon the register frame 43c by pushing on the push button 239 (Fig. 36) which will actuate the slide frame step by step, as hereinbefore described.

When the passenger leaves the vehicle and is ready to settle his account, the operator turns the handle shaft 7 by means of the handle 9 eight times from its initial position or seven times if at the time he stops the handle stands in the "fare" registering position. The third turn of the handle counting from normal or "vacant" position is adapted to actuate the rock frame carrying the platen and forces the platen against the types of the register frames and thereby print a record of the amounts of the charges on the record strip 357 and through the recording strip on to the card strip 342 substantially as hereinbefore described. Additional revolutions of the handle shaft 7 rock the rack frames 155 and 315 (Figs. 48 and 49) and shift the zero resetting mechanism and then move the racks downward to restore the respective cams to zero position, in the manner hereinbefore described. The additional turns of the handle also brings the cam 467 (Figs. 45 and 46) into operation to release the holding dogs 55, 56, etc., mounted upon the shafts 52 and 53 to permit the respective slide frames to return to zero position. The two slide frames 43b (Figs. 27 and 36), which are advanced step by step by the pawls or dogs 273 and 322, respectively, are released from these dogs by the downward extensions 473a of the lugs or fingers 473 on the shaft 472, as will be seen in Fig. 27 of the drawings. The handle cams 441 and 462 will rock the respective shafts 129 and 264 to release the units frames as hereinbefore described by withdrawing the respective gears 51 from the racks 50 of the slide frame. The number of rotations given the handle shaft 7 may be counted by the click of the pawl 498 in the notch in the disk 497 (Fig. 21), while the full-stroke mechanism (Fig. 20), will, after the second revolution of the handle, prevent return movement or rotation in the opposite direction until the full eight strokes of the handle have been made, thereby bringing the instrument back to normal starting position when the signal will show "Vacant" at the window 4.

During the handle operation, as previously described, the rock arm 478 is actuated by its cam to move the rack 481 downward and rotate the card strip outward through the slit 31 in position to be received by the operator when the knife 351 cuts it off. The ribbon will be fed forward one step by the actuation of the ribbon slide 282 (Fig. 19) through the arm 436 which actuates the knife.

At the end of the day the proprietor by means of his key may unlock the rear door 27 (Fig. 23) of the instrument, admitting him to the rear central compartment containing the printing mechanism. This will give him access to the record on the record strip 369 which has been fed into the cylindrical casing 366. While the door 27 is open any adjustments of the parts connected with the printing mechanism may be made and if the ribbon should require shifting this can be done by means of the knob 399 (Fig. 22) in the manner previously described.

It will be understood that during the run of the vehicle when hired at the "fare" rate, the total miles of run will be accumulated upon the counting device 178, but mileage will not be thus accumulated when the vehicle is run when not hired or when hired at the hour rate or in "waiting".

It will be understood that I have described one form or adaptation of my device and the specific details thereof, but various modifications may be made in the specific details of construction and parts may be left off or changed in its adaptation to particular vehicles by those skilled in the art without departing from the scope and spirit of the invention.

I claim:

1. In a recording taximeter, the combination of a plurality of slidable frames, a shaft intermittently driven from gearing adapted to be continuously driven, said shaft being longitudinally shiftable, gears secured to said shaft adapted to engage said frames one at a time, and means operated by said continuously driven gearing for shifting said shaft to cause disengagement of one frame and the engagement of another.

2. In a recording taximeter, the combination of a plurality of slidable frames, means intermittently driven from gearing adapted to be continuously driven for advancing said slides step by step, said means being adapted to engage but one frame at a time, and mechanism operated by said continuously driven gearing for shifting the engagement of said intermittent means from one frame to another.

3. In a recording taximeter, the combination of a plurality of slidable frames, continuously driven mechanism, a shaft intermittently operated thereby, means connected with said shaft for advancing said frames one at a time, and means operated by said continuously driven mechanism for shifting the operative connection of said shaft from one frame to another.

4. In a taximeter of the character described, the combination of a worm adapted to be driven by the vehicle, a worm gear, manually controlled means for moving the worm into and out of mesh with said worm gear, a disk adapted to be rotated by said worm gear after a predetermined idle movement thereof representing the minimum charge, a counting device, and means whereby the counting device is operated by said disk for registering the revolutions of the latter.

5. In a taximeter of the character described, the combination of a worm gear, a worm driven by the vehicle and adapted to be moved into and out of mesh with said worm gear, a pinion adapted to be driven by said worm gear after a preliminary idle movement of the latter representing the minimum charge, and means for automatically restoring the worm gear to initial relation with said pinion when said worm is moved out of mesh with said worm gear.

6. In a taximeter of the character described, the combination of a worm gear, a worm driven by the vehicle and adapted to be moved into and out of mesh with said worm gear, a pinion adapted to be driven by said worm gear after a preliminary idle movement of the latter, a slide frame adapted to be intermittently advanced by said pinion, manual means for advancing said frame an amount corresponding with the idle movement of said worm gear, means for disconnecting said worm and worm gear, and means for returning the latter to initial relation with said pinion when disconnected from the worm thereby permitting said idle movement when the worm and worm gear are again connected.

7. In a taximeter of the character described, the combination of slidable frames adapted to register fares in dollars and tenths of a dollar, gear mechanism for advancing the tenths frame step by step, power mechanism for driving said gear mechanism intermittently, means controlled by the last named mechanism for shifting said gear mechanism to actuate the dollars frame one step after the tenths frame has advanced nine steps, and means operated by the movement of the dollar frame to restore said tenths frame to normal zero position.

8. In a taximeter of the character described, the combination of slidable frames representing dollars and tenths of a dollar waiting time charge, a clock movement, means operated by the clock for advancing the tenths frame step by step, means operated by the clock for shifting said last-named means after the tenths frame has been advanced nine steps so as to advance the dollar frame one step, pawls for holding the respective frames in advanced position, said pawls interacting from left to right whereby advance of the dollar frame one step will release the tenths frame for return to normal or zero position.

9. In a taximeter of the character described, the combination of gearing adapted to be driven from the vehicle, slide frames adapted to be intermittently advanced by said gearing through a toothed disk, a spring for actuating said disk a predetermined amount, a pawl adapted to enter the teeth of said disk to lock the same, and means actuated by said gearing for releasing said pawl when the vehicle has traveled a prearranged distance, thereby permitting said spring to actuate said disk.

10. In a taximeter of the character described, the combination of gearing adapted to be driven from the vehicle, a plurality of slide frames each provided with a rack, a longitudinally slidable shaft provided with pinions adapted to mesh with the racks of said slide frames, said pinions being spaced so that one rack or frame at a time will be actuated by said shaft, and means actuated by said gearing at suitable intervals for shifting said shaft to bring one or another of said frame racks into gear with the corresponding pinion.

11. In a taximeter of the character described, the combination of gearing adapted to be driven from the vehicle, a plurality of slide frames each provided with a rack, a longitudinally slidable shaft provided with pinions adapted to mesh with the racks of said slide frames, a toothed disk adapted to turn said shaft step by step to advance one of said frames, a spring adapted for independently actuating said disk for each step, said spring being put under tension by said gearing, and a pawl coöperating with said disk to hold the same until said gearing has turned a prearranged amount representing the unit of charge.

12. In a taximeter of the character described, the combination of a clock movement, a plurality of waiting time registering slide frames each provided with a rack, a shaft adapted to be shifted transversely of said frames provided with pinions adapted to mesh with said racks, said pinions being spaced so that but one rack or frame is in gear at a time, and means controlled by said clock for shifting said shaft to determine which frame is to be in gear with the corresponding pinion.

13. In a taximeter of the character described, the combination of a clock movement, a plurality of waiting time registering slide frames each provided with a rack, a shaft adapted to be shifted transversely of said frames provided with pinions adapted to mesh with said racks, said pinions being spaced so that but one rack or frame is in gear at a time, means controlled by said clock for shifting said shaft to determine which frame is to be in gear with the corresponding pinion, and means actuated by the clock for rotating said shaft intermittently whereby said frames are advanced step by step.

14. In a taximeter of the character described, the combination of a movable unit register frame, a worm gear and intermediate connections for moving said frame step by step, a worm operated by the vehicle adapted to be thrown into and out of mesh with the worm gear, a rock lever for moving said unit frame independently of said gear connections and manually operated means for moving said worm into mesh and simultaneously rocking said lever for moving said unit register frame a predetermined amount to indicate the minimum charge.

15. In a taximeter of the character described, the combination of movable register frames, means including a longitudinally slidable shaft adapted to be operated from the vehicle for advancing said frames step by step, cam disks operated by the vehicles for sliding said shaft longitudinally when tens are to be transferred and manual means for shifting said shaft.

16. In a taximeter of the character described, the combination of a plurality of slidable register frames, a longitudinally slidable shaft adapted to be operated by the vehicle for advancing said frames one at a time step by step, cam disks for shifting said shaft longitudinally when tens are to be transferred and a spring for moving said shaft in opposition to said cams and holding it in position for advancing the units register frame.

17. In a taximeter of the character described the combination of two series of longitudinally slidable frames, a gear shaft for each series for advancing step by step one frame at a time, gear mechanism adapted to be continuously driven for operating each series, means operated by the continuously driven mechanisms for shifting the respective shafts longitudinally to select the frames to be advanced and manual means for causing said shafts to be operated by their respective continuously driven mechanisms, one shaft remaining idle while the other is being driven.

18. In a taximeter of the character described the combination of two series of longitudinally slidable frames, a gear shaft for each series for advancing step by step one frame at a time, gear mechanism adapted to be continuously driven for operating each series, means operated by the continuously driven mechanisms for shifting the respective shafts longitudinally to select the frames to be advanced, said shafts being so shifted when one frame of the corresponding series has been advanced nine steps, means for releasing frames advanced nine steps and returning them to zero when an adjacent frame of the series is advanced and manual means for causing said shafts to be operated by their respective continuously driven mechanisms, one shaft remaining idle while the other is being driven.

19. In a taximeter of the character described the combination with means for making a record of amounts indicated, of a plurality of longitudinally slidable totalizer frames provided with type on one face and indicating characters on the other, gearing adapted to be continuously driven, intermediate mechanism whereby said continuously driven mechanism is adapted to advance said frames step by step one at a time, a shaft adapted to be shifted by said continuously driven gearing for automatically determining which of said frames is to be advanced step by step and means actuated by said step by step mechanism in advancing a frame for releasing and restoring to zero other of said frames already advanced nine steps.

20. In a taximeter of the character described the combination of a clock mechanism, a plurality of longitudinally slidable register frames provided with types on one face and indicating characters on the other, mechanism operable by the clock for advancing said frames step by step, including a longitudinally movable shaft provided with pinions adapted to engage one frame at a time, means controlled by the clock for shifting said shaft longitudinally to disengage one frame and engage another and a rock frame, adapted to be actuated by said clock, carrying a pawl for advancing one of said frames to register hour rate charges.

21. In a taximeter of the character described the combination of a clock mechanism, a plurality of longitudinally slidable register frames provided with types on one face and indicating characters on the other, mechanism operable by the clock for advancing said frames step by step, including a longitudinally movable shaft provided with pinions adapted to engage one frame at a time, means controlled by the clock for shifting said shaft longitudinally to disengage one frame and engage another, a rock frame, adapted to be actuated by said clock, carrying a pawl for advancing one of said frames to register hour rate charges and manual means for operatively disconnecting the clock mechanism from said longitudinally movable shaft and permitting it to actuate said rock frame.

22. In a taximeter of the character described the combination of a clock mechanism, a plurality of longitudinally slidable register frames provided with types on one face and indicating characters on the other, mechanism operable by the clock for advancing said frames step by step, including a longitudinally movable shaft provided with pinions adapted to engage one frame at a time, means controlled by the clock for shifting said shaft longitudinally to disengage one frame and engage another, a rock frame, adapted to be actuated by said clock, carrying a pawl for advancing one of said frames to register hour rate charges, manual means for operatively disconnecting the clock mechanism from said longitudinally movable shaft and permitting it to actuate said rock frame and a signal operatively connected with said last named means to show that the hour rate is operative.

23. In a taximeter of the character described the combination of a plurality of longitudinally slidable register frames, mechanism adapted to be continuously driven, a shaft slidably and rotatably mounted transversely of said frames provided with pinions for engaging certain of said frames one at a time, means whereby said continuously driven mechanism is adapted to rotate said shaft intermittently to advance said frames step by step and to shift said shaft longitudinally to disengage one frame and engage another, a pawl manually operable to advance one of said frames for extra charges, pawls for retaining the respective frames in advanced positions, a rod on which all of said pawls are pivotally mounted and manually operated means for simultaneously lifting all of said pawls.

24. In a taximeter of the character described, the combination of a plurality of longitudinally slidable register frames, a shaft transversely of said frames provided with a corresponding plurality of pinions for engaging and sliding the respective frames when said shaft is turned, said pinions being spaced to engage one frame at a time, gear mechanism adapted to be continuously driven, mechanism operated thereby for intermittently turning said shaft to advance the frame in gear therewith step by step and cam mechanism operated by said continuously driven gearing for shifting said shaft longitudinally to disengage one frame and engage an adjacent frame to the left during the tenth step by step movement of said shaft.

25. In a taximeter of the character described, the combination of a plurality of longitudinally slidable register frames, a shaft transversely of said frames provided with a corresponding plurality of pinions for engaging and sliding the respective frames when said shaft is turned, said pinions being spaced to engage one frame at a time, gear mechanism adapted to be continuously driven, mechanism operated thereby for intermittently turning said shaft to advance the frame in gear therewith step by step, cam mechanism operated by said continuously driven gearing for shifting said shaft longitudinally to disengage one frame and engage an adjacent frame to the left during the tenth step by step movement of said shaft, pawls for holding said frames in advanced positions and means, operative when said shaft is shifted to disengage one frame for lifting the holding pawl thereof and permit the frame thus disengaged to return to initial position.

26. In a taximeter of the character described, the combination of longitudinally slidable register frames representing units, tens and hundreds, a shaft transversely of said frames provided with pinions adapted to engage and slide said frames one at a time, the units frame being normally engaged, a train of gearing adapted to be continuously driven, means connected therewith for turning said shaft step by step, a cam on one gear of the train for shifting said shaft longitudinally to disconnect the units frame and connect the tens frame therewith, a second cam on a gear of the train for shifting said shaft to engage the hundreds frame, said cams being so spaced as to shift said shaft and hold it in shifted position during the tenth step by step movement thereof, pawls for holding the frames in advanced positions and means for releasing and returning to initial position the frame or frames to the right of the engaged frame.

27. In a taximeter of the character described, the combination of longitudinally slidable register frames, a shaft transversely of said frames provided with pinions adapted to engage and slide said frames one at time, the units frame being normally engaged, a train of gearing adapted to be continuously driven, means connected therewith for turning said shaft step by step, a cam on one gear of the train for shifting said shaft longitudinally to disconnect the units frame and connect the tens frame therewith, a second cam on a gear of the train for shifting said shaft to engage the hundreds frame, said cams being so spaced as to shift said shaft and hold it in shifted position during the tenth step by step movement thereof, pawls for holding the frames in advanced positions, means for releasing and returning to initial position the frame or frames to the right of the engaged frame and means operative by turning the handle for shifting said shaft to disengage all of said frames.

ALFRED G. F. KUROWSKI.

Copies of this patent may be obtained for five cents each, by addressing the "Commissioner of Patents, Washington, D. C."